US012788136B2

(12) United States Patent
Saint-Jean, Jr.

(10) Patent No.: US 12,788,136 B2
(45) **Date of Patent: *Nov. 10, 2026**

(54) MOBILE TRAILER-CLEANING SYSTEM

(71) Applicant: Eugene Saint-Jean, Jr., Miami, FL (US)

(72) Inventor: Eugene Saint-Jean, Jr., Miami, FL (US)

( * ) Notice: Subject to any disclaimer, the term of this patent is extended or adjusted under 35 U.S.C. 154(b) by 235 days.

This patent is subject to a terminal disclaimer.

(21) Appl. No.: 18/668,886

(22) Filed: May 20, 2024

(65) Prior Publication Data

US 2024/0298788 A1 Sep. 12, 2024

Related U.S. Application Data

(63) Continuation-in-part of application No. 17/367,290, filed on Jul. 2, 2021, now Pat. No. 11,986,084, which (Continued)

(51) Int. Cl.

*A46B 13/02* (2006.01)
*A46B 7/04* (2006.01)

(Continued)

(52) U.S. Cl.

CPC ................ *A46B 13/04* (2013.01); *A46B 7/04* (2013.01); *A46B 9/026* (2013.01); *A46B 13/001* (2013.01);

(Continued)

(58) Field of Classification Search

CPC ............... B60S 3/06; B60S 3/00; A46B 13/02
See application file for complete search history.

(56) References Cited

U.S. PATENT DOCUMENTS 4,450,600 A 5/1984 Shelstad
11,986,084 B2 * 5/2024 Saint-Jean, Jr. .......... B60S 3/06

(Continued)

FOREIGN PATENT DOCUMENTS

CH 674729 A5 7/1990

OTHER PUBLICATIONS

ITECO Washing Systems, ITECO Easy Wash 50E, Retrieved From Internet, Retrieved on May 22, 2024, <URL: https://www.hhands.co.uk/product/iteco-easy-wash-50e/>.

(Continued)

*Primary Examiner* — Michael D Jennings

(57) ABSTRACT

A mobile trailer-cleaning system is a system that facilitates the cleaning of the exterior surfaces of a trailer. The system may include at least one brush assembly, a roof carriage, an agitation mechanism, and a steering assembly. The at least one brush assembly enables the cleaning of all the trailer's exterior surfaces including the rear of the trailer and any non-flat surfaces. The roof carriage serves as a guide to maintain the at least one brush assembly adjacent to the trailer's walls as the at least one brush assembly moves along the trailer. The roof carriage also prevents the at least one brush assembly from tipping over. The agitation mechanism eases the cleaning of the trailer's exterior surfaces by agitating the at least one brush assembly in predetermined modes of operation. The steering assembly enables the user to manually operate the at least one brush assembly during the cleaning process.

20 Claims, 27 Drawing Sheets

Related U.S. Application Data is a continuation-in-part of application No. 29/765,748, filed on Jan. 11, 2021, now Pat. No. Des. 956,427, which is a continuation-in-part of application No. 29/749,478, filed on Sep. 4, 2020, now Pat. No. Des. 956,428.

(60) Provisional application No. 63/047,823, filed on Jul. 2, 2020.

(51) Int. Cl.

| | |
|---|---|
| ***A46B 9/02*** | (2006.01) |
| ***A46B 13/00*** | (2006.01) |
| ***A46B 13/04*** | (2006.01) |
| ***A46B 15/00*** | (2006.01) |
| ***B60S 3/04*** | (2006.01) |
| ***B60S 3/06*** | (2006.01) |

(52) U.S. Cl.

CPC ........ *A46B 13/023* (2013.01); *A46B 15/0004* (2013.01); *A46B 15/003* (2013.01); *A46B 15/0051* (2013.01); *B60S 3/044* (2013.01); *B60S 3/047* (2013.01); *A46B 2200/3073* (2013.01); *B60S 3/06* (2013.01)

(56) References Cited

U.S. PATENT DOCUMENTS

| | | | | |
|---|---|---|---|---|
| 2016/0107617 | A1* | 4/2016 | Yeaglin | B60S 3/06 15/97.3 |
| 2016/0278512 | A1* | 9/2016 | Allen-Gipson | A46B 13/001 |
| 2016/0311407 | A1* | 10/2016 | Belanger | B60S 3/04 |
| 2016/0311408 | A1* | 10/2016 | Belanger | B60S 3/063 |
| 2017/0063293 | A1* | 3/2017 | Parrott | F24S 40/20 |
| 2018/0281753 | A1* | 10/2018 | Conny | B60S 3/008 |

OTHER PUBLICATIONS

Transport Wash Systems, Single Brush Wash Systems, Retrieved From Internet, Retrieved on May 22, 2024, <URL: https://transportwashsystems.com/home/single-brush-wash-systems/>.

Bitimec, Products, Retrieved From Internet, Retrieved on May 22, 2024, <URL: https://www.bitimec.com/en/products/>.

* cited by examiner

MOBILE TRAILER-CLEANING SYSTEM

The current application is a continuation-in-part (CIP) application of a U.S. non-provisional application Ser. No. 17/367,290 filed on Jul. 2, 2021. The U.S. non-provisional application Ser. No. 17/367,290 claims a priority to a U.S. provisional application Ser. No. 63/047,823 filed on Jul. 2, 2020.

The U.S. non-provisional application Ser. No. 17/367,290 is also a CIP application of the U.S. design application Ser. No. 29/765,748 filed on Jan. 11, 2021. The U.S. design application Ser. No. 29/765,748 is a CIP application of the U.S. design application Ser. No. 29/749,478 filed on Sep. 4, 2020.

FIELD OF THE INVENTION

The present invention relates generally to trailer accessories and cleaning systems. More specifically, the present invention discloses a trailer-cleaning system designed as a mobile system that can be deployed wherever necessary.

BACKGROUND OF THE INVENTION

Trailers are widely used to transport different cargo across long distances. Due to the continuous use of trailers, regular maintenance is required to prolong the durability of the trailers, such as keeping the outside of the trailer clean and free of debris. Washing a trailer down is a mandatory but exhausting process. Due to the sheer size of most trailers, it could take a team of individuals hours to clean the trailer. The most exhaustive part of the cleaning process is the scrubbing of the sides of the trailer. Currently, there are various trailer cleaning systems that enable people to clean the sides of the trailer. However, these cleaning systems are often located in fixed, and sometimes remote, locations that the trailer needs to be taken to as few trailer parking locations are equipped with such systems. In addition, there is no cleaning system that can efficiently scrub the sides of a trailer in place of an actual team that can be easily transported and deployed by a single person or few people. Therefore, there is a need for a mobile cleaning system that can be easily transported and deployed to clean a trailer without the need for multiple people operating the system.

An objective of the present invention is to provide a mobile trailer-cleaning system that enables a single person to clean the outside surfaces of a trailer easily and efficiently. The present invention can be operated by a single person or by a team of people to clean the desired trailer. Another objective of the present invention is to provide a system that can be easily deployed and adjusted to fit the exterior structure of the trailer to avoid causing damage to the trailer. The present invention is a portable system that can be easily transported and deployed at the necessary location to clean the desired trailer. Another objective of the present invention is to provide a system that can be operated by a single user or a few people without the need for an external source of power. The present invention can be transported and operated at remote locations to clean the desired trailer. Additional features and benefits of the present invention are further discussed in the sections below.

SUMMARY OF THE INVENTION

The present invention is a mobile trailer-cleaning system designed to facilitate the cleaning of the exterior surfaces of any trailer. The present invention improves the trailer cleaning process by removing the need of a team of people to wash the trailer. The present invention also eliminates the need to move the trailer to a remote location to use existing cleaning systems to clean the trailer. To do so, the present invention includes a modular design that is easily assembled or disassembled. The modular design of the present invention also enables the replacement of the different components for maintenance purposes or to replace the components to efficiently clean the trailer. Further, the present invention enables manual or automatic operation of the system, which allows the user to focus on other aspects of the trailer cleaning process such as spraying the trailer with water and soap. Various cleaning attachments such as a spray mechanism to dispense cleaning materials or an undercarriage cleaning attachment are provided to help the user better clean the trailer's exteriors. Additionally, the present invention can be configured in multiple ways to target different areas of the trailer, such as the rear of the trailer where surfaces or non-flat surfaces are present. Thus, the user can efficiently clean the trailer without damaging the exterior surfaces or any other ornaments on the trailer.

DETAILED DESCRIPTION OF THE INVENTION

Figure 1:
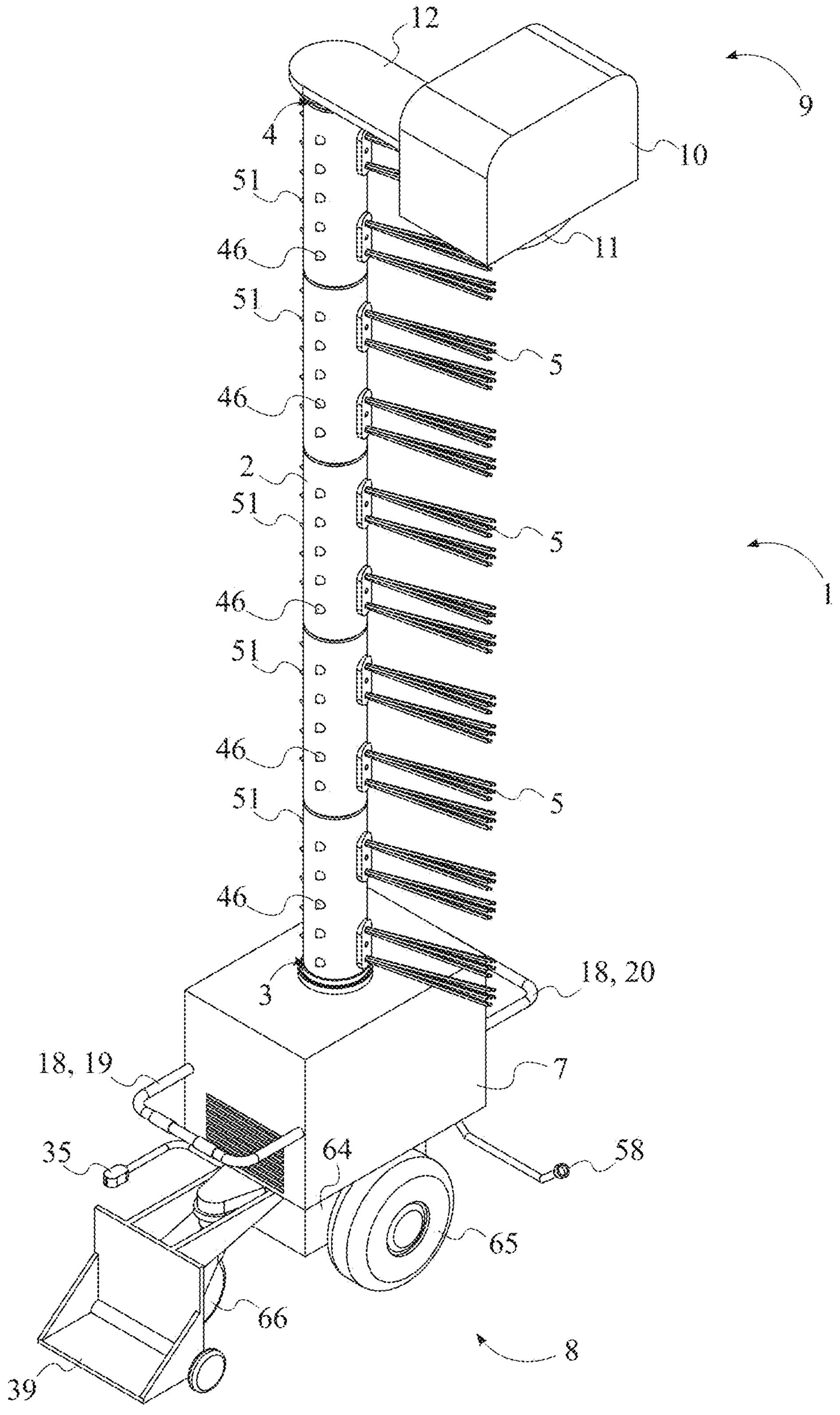
FIG. 1 is a top front perspective view showing the present invention, wherein the at least one brush assembly is shown as an individual unit.

All illustrations of the drawings are for the purpose of describing selected versions of the present invention and are not intended to limit the scope of the present invention.

The present invention is a mobile trailer-cleaning system that facilitates the cleaning of the exterior surfaces of a trailer. The present invention enables the cleaning of the trailer's exteriors without damaging the exterior surfaces or any attachment placed on the exterior of the trailer. As can be seen in FIGS. 1 through 11, the present invention may comprise at least one brush assembly 1, a roof carriage 9, an agitation mechanism 13, and a steering assembly 18. The at least one brush assembly 1 enables the cleaning of all the trailer's exterior surfaces as well as other elements of the trailer. The roof carriage 9 serves as a guide to maintain the at least one brush assembly 1 adjacent to the trailer's lateral walls from a safe distance. The roof carriage 9 also prevents the at least one brush assembly 1 from tipping over while cleaning the trailer. The agitation mechanism 13 eases the cleaning of the trailer's exterior surfaces by agitating the at least one brush assembly 1 in predetermined modes of operation. The steering assembly 18 enables the user to manually or remotely operate the at least one brush assembly 1 or to set the present invention for automatic operation.

The general configuration of the aforementioned components enables the user to easily clean the exterior of the trailer without requiring the help of additional people or additional cleaning tools. As can be seen in FIGS. 1 through 11, the at least one brush assembly 1 is designed to scrub the exterior surfaces of the trailer with the use of water and/or other cleaning solutions the user chooses to use. The at least one brush assembly 1 comprises a support column 2, a plurality of bristle sets 5, a base structure 7, a wheel assembly 8, and a base lifting mechanism 35. The support column 2 positions the plurality of bristle sets 5 in such a way that the plurality of bristle sets 5 can reach most of the lateral surfaces of the trailer. The base structure 7 is designed to receive the load from the support column 2 and the plurality of bristle sets 5 as the trailer is being cleaned. The base structure 7 also prevents the support column 2 from tipping over as the plurality of bristle sets 5 is pressed against the lateral exterior surfaces of the trailer. The wheel assembly 8 enables the base structure 7 to be moved along the trailer during the cleaning process. The wheel assembly 8 can include multiple wheels to help maintain the balance of the overall structure or a pair of wheels with an integrated balancing mechanism. The base lifting mechanism 35 allows the base structure 7 to be raised from the ground to allow the plurality of bristle sets 5 to reach high surfaces of the trailer.

As can be seen in FIGS. 1 through 11, moreover, the roof carriage 9 comprises a carriage body 10, at least one roller 11, and at least one extension arm 12. The carriage body 10 is designed to stabilize the roof carriage 9 on top of the trailer's roof. The at least one roller 11 enables the carriage body 10 to roll on top of the trailer's roof to not damage the trailer's roof. The at least one extension arm 12 connects the carriage body 10 to the at least one brush assembly 1 so that the carriage body 10 can be positioned offset to the support column 2. The support column 2 is preferably an elongated tubular structure with a length long enough to span the height of the trailer. So, the support column 2 comprises a first column end 3 and a second column end 4 corresponding to the opposing terminal ends of the support column 2.

In the preferred embodiment, the present invention can be arranged as follows. As can be seen in FIGS. 1 through 11, the at least one roller 11 is rotatably mounted to the carriage body 10 so that the load of the carriage body 10 rests on the at least one roller 11. The carriage body 10 is terminally mounted to the at least one extension arm 12 so that the carriage body 10 can be positioned at a distance from the lateral edge of the trailer's roof. The second column end 4 is terminally mounted to the at least one extension arm 12, opposite to the carriage body 10. Thus, the carriage body 10 is secured to the support column 2 by the at least one extension arm 12. In some embodiments, the carriage body 10 and/or the at least one extension arm 12 are replaceable components that can be easily attached to the support column 2 using different releasable fasteners such as a snap-and-twist fastening mechanism. Further, the carriage body 10 and/or the at least one extension arm 12 can be replaced with a spray mechanism designed to dispense cleaning materials to the exterior surfaces of the trailer to aid with the cleaning process. Further, the first column end 3 is mounted adjacent to the base structure 7 to secure the support column 2 to the base structure 7. The wheel assembly 8 is mounted adjacent to the base structure 7 by the base lifting mechanism 35, opposite to the first column end 3, so that the base structure 7 rests on the wheel assembly 8. In addition, the base lifting mechanism 35 allows for the base structure 7 to be raised higher above ground to allow the plurality of bristle sets 5 to reach higher surfaces of the trailer. For example, the base lifting mechanism 35 can be a mechanical or hydraulic jack that is integrated between the wheel assembly 8 and the base structure 7. The mechanical or hydraulic jack can also include a lever that allows the user to selectively engage the base lifting mechanism 35. In other embodiments, different base lifting mechanism 35*s* can be utilized that allow the user to raise the base structure 7 without using manual force.

As can be seen in FIGS. 1 through 13, the steering assembly 18 is mounted adjacent to the base structure 7, in between the first column end 3 and the wheel assembly 8, so that the steering assembly 18 is accessible to the user. The plurality of bristle sets 5 is distributed along the support column 2 so that the plurality of bristle sets 5 covers the length of the support column 2 for efficient cleaning of the surfaces. The plurality of bristle sets 5 is also laterally mounted onto the support column 2 to secure each of the plurality of bristle sets 5 to the support column 2. Each of the plurality of bristle sets 5 can provide different types of bristles to improve the cleaning process of the trailer. For example, the plurality of bristle sets 5 can be a plurality of interchangeable bristle sets 36 that the user can choose from to clean the desired trailer surfaces. For example, the plurality of interchangeable bristle sets 36 can include a bristle set with several bristles arranged in a vertical column. The plurality of interchangeable bristle sets 36 can also include a bristle set with two or more vertical columns of bristles to cover a wider surface area.

Further, as can be seen in FIGS. 1 through 13, the plurality of interchangeable bristle sets 36 can also include a bristle set that includes a rubber squeegee, such as a silicone squeegee, which can be utilized to remove solids from the trailer's surfaces (e.g., snow, dirt, etc.). At least one of the vertical columns can include hard bristles to help remove debris from the trailer surfaces. Further, plurality of interchangeable bristle sets 36 can include a bristle set with an elongated arm that offsets the bristles from the support column 2. In addition, the bristles can be arranged into a curved or semi-circular arrangement to facilitate the cleaning of curved surfaces. Furthermore, the plurality of bristle sets 5 can include several round motorized bristles arranged in a vertical arrangement, wherein each round motorized bristle overlaps the adjacent bristles. In addition, each round motorized bristle can include a bristle nozzle of a plurality of bristle nozzles 66 that can be arranged to dispense water, soap, or another type of cleaning solution while the round motorized bristles clean the trailer. In other embodiments, the present invention can include different types of replaceable bristle sets.

As can be seen in FIGS. 1 through 11 and 22, to increase the mobility of the present invention, the present invention may further comprise at least one accelerator control 21 and at least one drive system 22. The at least one accelerator control 21 enables the user to control the speed at which the present invention is moving. The at least one drive system 22 provides the motorized means for the base structure 7 to move without requiring the user to exert force on the base structure 7. The wheel assembly 8 can include a pair of wheels mounted on an axle that enables the rotation of the pair of wheels. The at least one accelerator control 21 is mounted onto the steering assembly 18 so that the at least one accelerator control 21 is accessible to the user. The at least one drive system 22 is mounted within the base structure 7 to protect the electrical components and the electronic components of the at least one drive system 22 from the surroundings. In addition, the at least one drive system 22 is operatively coupled to the wheel assembly 8, wherein the at least one drive system 22 is used to selectively accelerate rotation of the wheel assembly 8. For example, the at least one drive system 22 can include a motor and a transmission mechanism that transmits the torque generated by the motor to the wheel assembly 8. The at least one drive system 22 can include, but is not limited to, electrically-powered systems or diesel-powered systems. The at least one accelerator control 21 is also operatively coupled to the at least one drive system 22, wherein the accelerator control is used to actuate the at least one drive system 22. For example, the at least one accelerator control 21 can include a twist throttle grip that enables the user to control the acceleration of the wheel assembly 8. In other embodiments, the present invention can utilize different motorized means to facilitate the movement of the present invention.

Figure 19:
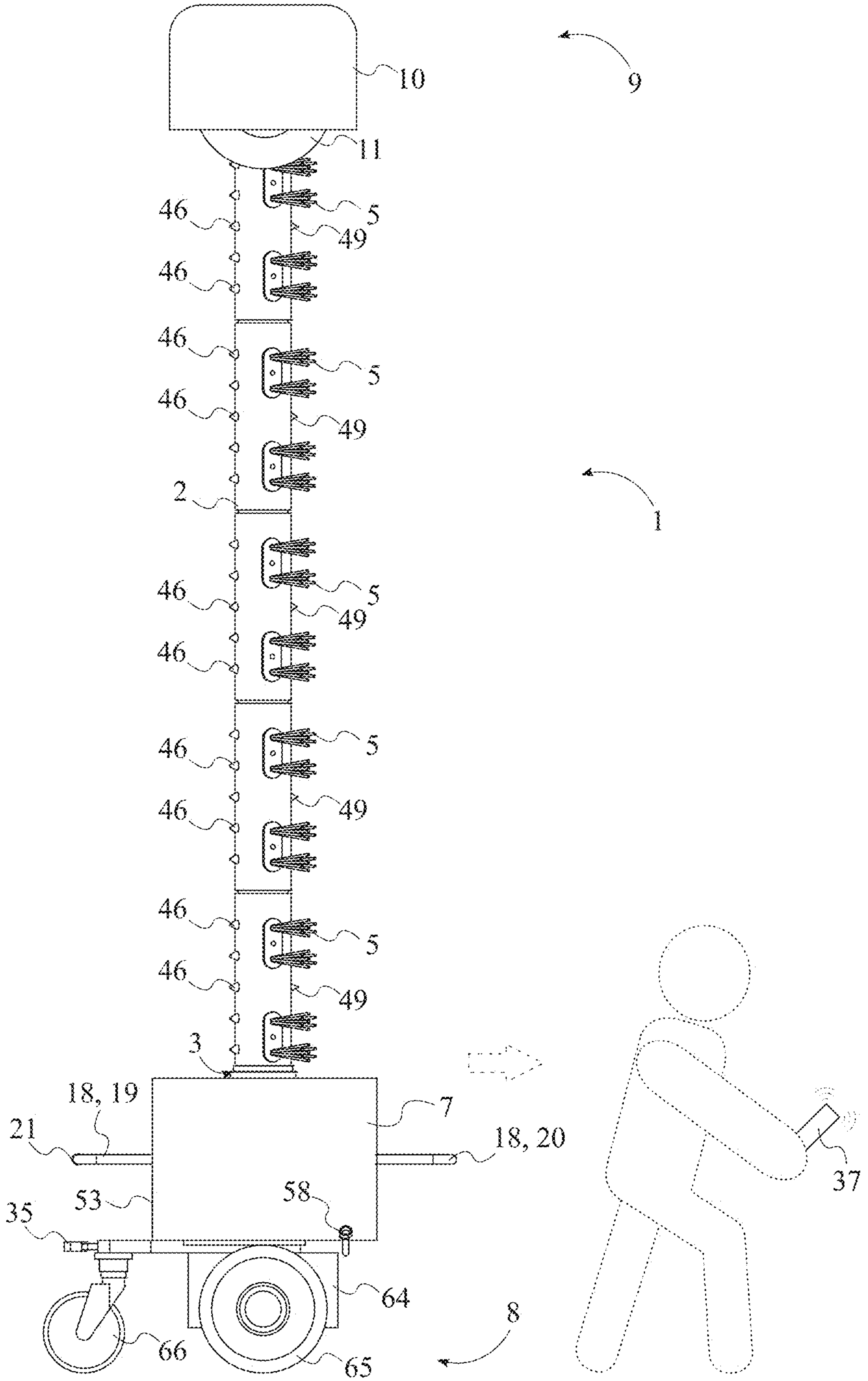
FIG. 19 is a side view thereof, wherein the at least one brush assembly is shown following an operator with a remote control.
Figure 22:
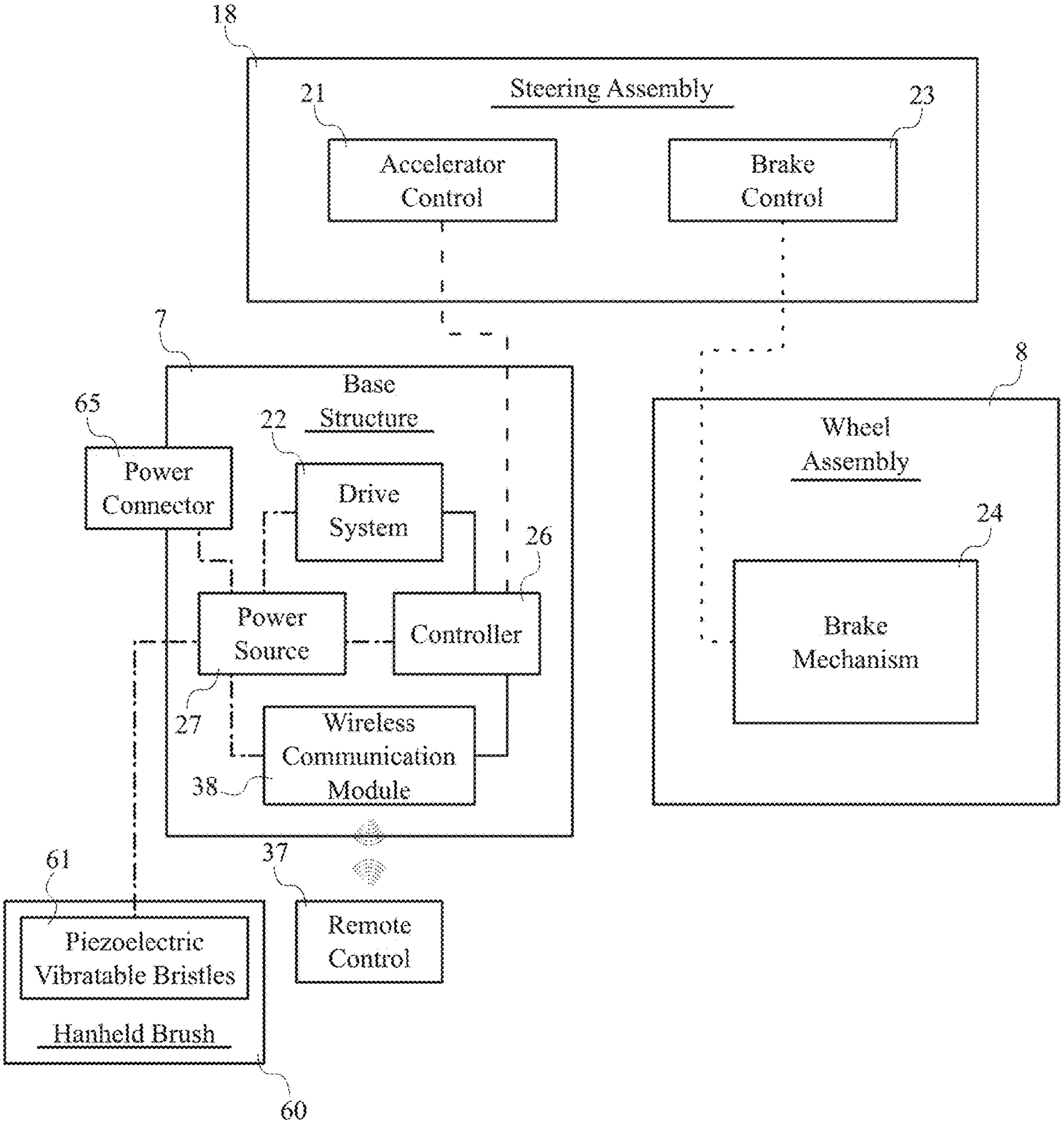
FIG. 22 is a schematic view showing the at least one accelerator control, the at least one drive system, the at least one brake control, and the at least one brake mechanism of the present invention, wherein the drive system connections are shown as dashed path lines, wherein the brake mechanism connections are shown as dotted path lines, wherein the electrical connections are shown as solid path lines, and wherein the electronic connections are shown in dot-dash path lines.

In some embodiments, the present invention can be configured to move autonomously based on predetermined parameters. For example, the at least one drive system 22 can be configured to move the present invention in the direction of the user operating the present invention. As can be seen in FIGS. 19 and 22, in this embodiment, the present invention may further comprise a remote control 37, a controller 26, a wireless communication module 38, and a power source 27. The remote control 37 enables the user to remotely operate the at least one drive system 22 as well as other electronic components of the present invention. The remote control 37 also serves as a beacon that the at least one drive system 22 can follow while cleaning the trailer. The wireless communication module 38 enables the operating signals from the remote control 37 to be wirelessly transmitted to the controller 26 for processing. The controller 26 processes the operating signals received by the wireless communication model and transmits the processed commands to the appropriate components. Further, the controller 26 and the wireless communication module 38 are mounted within the base structure 7 to isolate the controller 26 and the wireless communication module 38 from the surroundings. Similarly, the power source 27 is integrated into the base structure 7 to isolate the electrical components from the surroundings.

The power source can be a fuel-powered portable electricity generator that the user can fill with the appropriate fuel (e.g., gasoline, diesel, etc.) to power up the generator prior to operating the present invention. Alternatively, the power source 27 can include multiple rechargeable batteries that can be recharged from an external power source. As can be seen in FIGS. 22 through 24, 26, and 27, the present invention may further include a power connector 65 that allows the power source 27 to receive power from an external power source, such as electricity utilities. This allows the present invention to be operated even after the power source 27 has been depleted. So, the power connector 65 can be laterally integrated into the base structure 7. This enables the power connector 65 to be external to the base structure 7. Further, the power connector 65 is electrically connected to the power source 27. This way, the power source 27 can be recharged while the present invention is operated, allowing the user to operate the cleaning features of the present invention for prolonged periods. In other embodiments, the power source 27 can be provided as replaceable fuel cells that can be easily replaced once depleted for continuous operation of the present invention.

As can be seen in FIGS. 19 and 22, the remote control 37 is positioned external and offset to the base structure 7 to enable the user to position themselves at a distance from the base structure 7 depending on the wireless range of the remote control 37. In addition, the remote control 37 is communicably coupled to the controller 26 through the wireless communication module 38 to enable the transmission of the operating signals from the remote control 37 to the controller 26. Further, the wireless communication module 38 and the at least one drive system 22 are electronically connected to the controller 26 to enable the distribution of the processed signals to the appropriate components. Furthermore, the wireless communication module 38 and the controller 26 are electrically connected to the power source 27 to receive the power necessary to operate. Thus, the at least one drive system 22 may operate as follows. Once the user activates the autonomous operation of the at least one drive system 22, the user can position at the starting location from which the present invention follows the user. As the user moves, the at least one drive system 22 moves the base structure 7 using the wheel assembly 8 in the direction of the user. The at least one drive system 22 can be configured to follow the remote control 37 at a distance to prevent the base structure 7 from hitting the user carrying the remote control 37. Further, the user may remotely control the movement of the present invention using buttons provided on the remote control 37. In other embodiments, different autonomous or semi-autonomous modes of operation can be implemented for the at least one drive system 22. For example, the at least one drive system 22 can be configured to move the present invention in predetermined paths.

As can be seen in FIGS. 1 through 11, to support the load of the present invention while operating, the wheel assembly 8 is designed to only facilitate the movement of the present invention, but also to maintain the present invention in an overall upright orientation. To do so, the wheel assembly 8 may further comprise an assembly base 64, a pair of drive wheels 65, and at least one stability wheel 66. The assembly base 64 corresponds to the structure that supports the rotation of the pair of drive wheels 65 and the at least one stability wheel 66. The pair of drive wheels 65 enable the movement of the present invention in the desired direction. The at least one stability wheel 66 provides stability to the base structure 64 while the present invention is being utilized. Further, the at least one stability wheel 66 is positioned adjacent to the steering assembly 18 to prevent the brush assembly from tipping towards the user. The at least one stability wheel 66 is also positioned offset to the assembly base 64 to increase the base area of the wheel assembly 8, which in turn increases the stability of the base structure 7. Further, the at least one stability wheel 66 is rotatably connected to the assembly base 64 to enable the movement of the base structure 7. For example, the at least one stability wheel 66 can be a caster wheel that rotates in the direction of the base structure 7 movement. Further, a rotation axis 67 of the at least one stability wheel 66 and a rotation axis 67 of each of the pair of drive wheels 65 is positioned perpendicular to the support column 2 to enable the unobstructed movement of the base structure 7 in the desired direction. Each of the pair of drive wheels 65 is rotatably connected to the assembly base 64 to allow the rotation of the pair of drive wheels 65 while securing the pair of drive wheels 65 to the assembly base 64. Furthermore, the assembly base 64 is connected adjacent to the base structure 7 by the base lifting mechanism 35, opposite to the support column 2, to enable the elevation of the base structure 7 from the ground. In other embodiments, different wheel arrangements can be implemented.

As can be seen in FIGS. 1 through 11 and 22, to help the user to slow down the movement of the present invention or to bring the present invention to a stop, the present invention may further comprise at least one brake control 23 and at least one brake mechanism 24. The at least one brake mechanism 24 enables users to control the speed of the moving present invention. The at least one brake control 23 provides the user with the ability to engage the at least one brake mechanism 24, as necessary. The at least one brake control 23 is mounted onto the steering assembly 18 so that the at least one brake control 23 is always accessible to the user. The at least one brake mechanism 24 is also operatively integrated into the wheel assembly 8, wherein the at least one brake mechanism 24 is used to selectively decelerate rotation of the wheel assembly 8. For example, the at least one brake mechanism 24 can include a pair of disk brake assemblies mounted onto the pair of wheels of the wheel assembly 8. Further, the at least one brake control 23 is operatively coupled to the at least one brake mechanism 24, wherein the at least one brake control 23 is used to actuate the at least one brake mechanism 24. For example, the at least one brake control 23 is a spring-loaded brake lever connected to the pair of disk brake assemblies to slow the rotation down of the pair of wheels. In other embodiments, the present invention can utilize different brake mechanisms to help the user control the speed of the moving present invention.

As previously discussed, the steering assembly 18 can be designed to enable the user to physically maneuver the present invention. Due to the size of the present invention, the user may have difficulty maneuvering the at least one brush assembly 1 while cleaning the trailer's exterior surfaces. As can be seen in FIGS. 1 through 11, the present invention may further comprise a first handlebar 19 and a second handlebar 20 that enable the users to use both hands to steer the at least one brush assembly 1 from different sides of the base structure 7. So, the first handlebar 19 and the second handlebar are positioned opposite to each other about the base structure 7 to enable the user to push or pull the base structure 7. Further, the first handlebar 19 and the second handlebar can each be oriented at an angle with the base structure 7 so that the user can more ergonomically steer the at least one brush assembly 1. The first handlebar 19 and the second handlebar 20 can also include grip material to further facilitate the handling of the base structure 7. In other embodiments, the steering assembly 18 may include different handlebar designs that are more comfortable to utilize.

Figure 2:
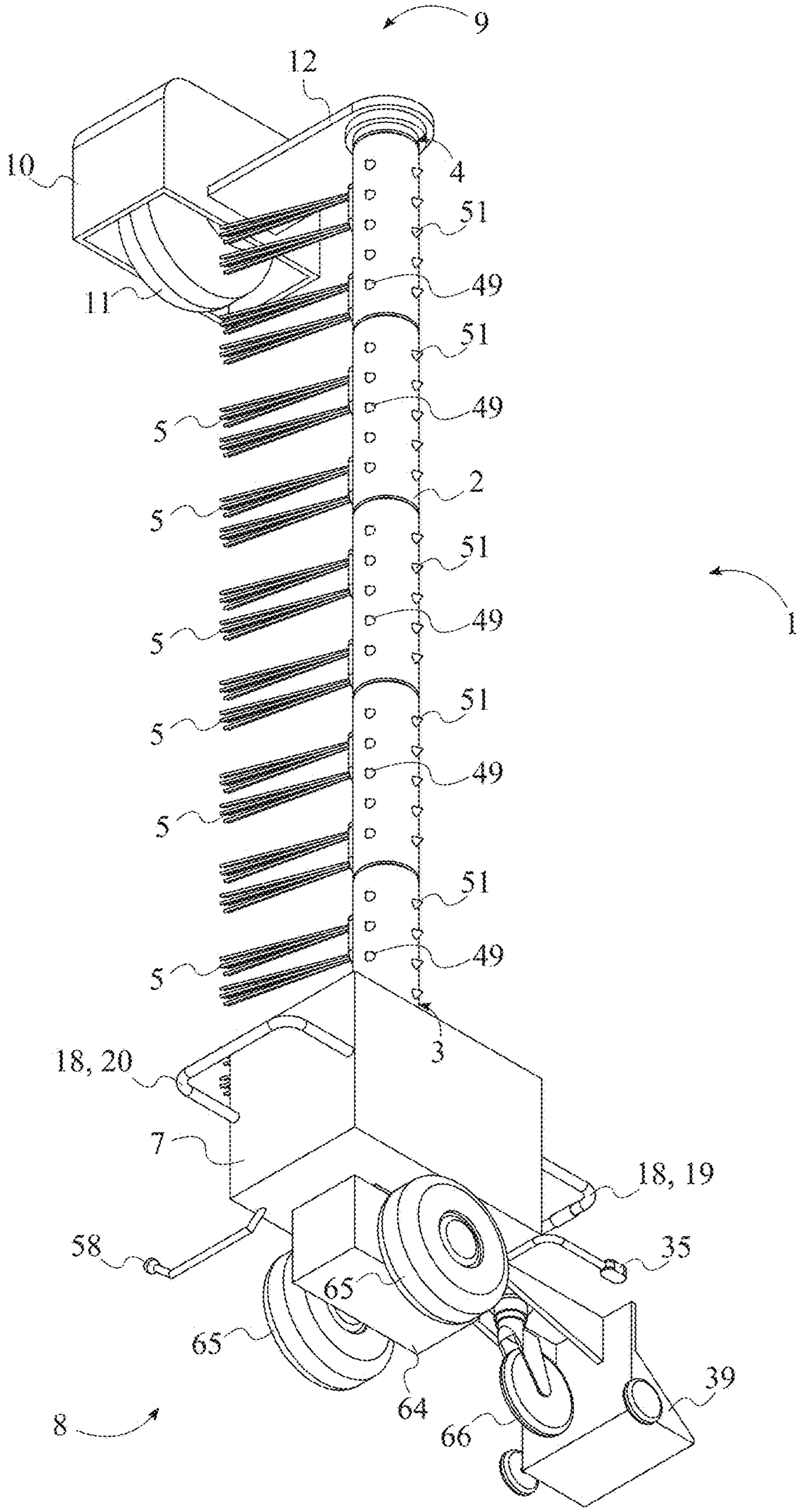
FIG. 2 is a bottom rear perspective view thereof.
Figure 3:
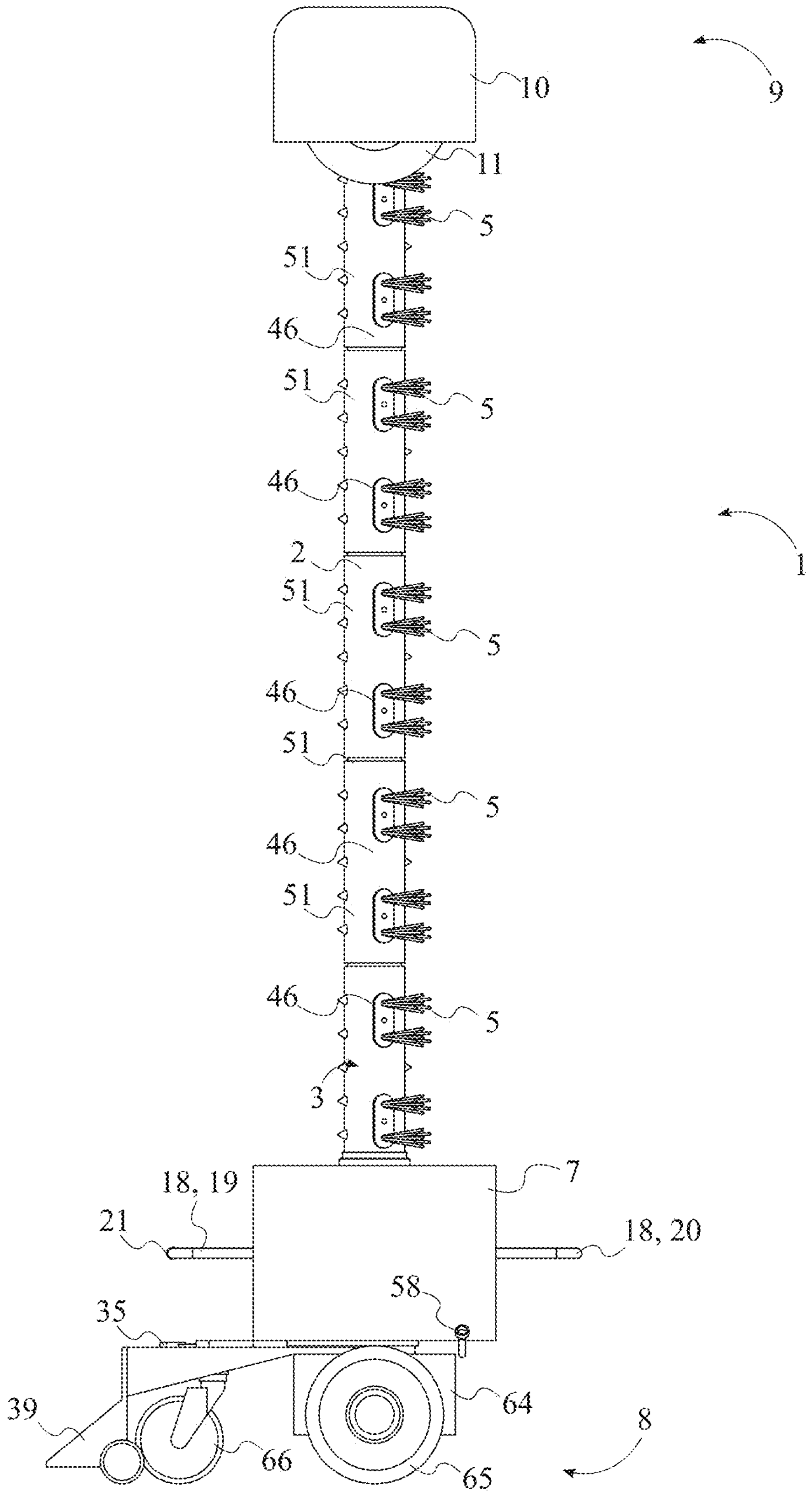
FIG. 3 is a side view thereof.
Figure 4:
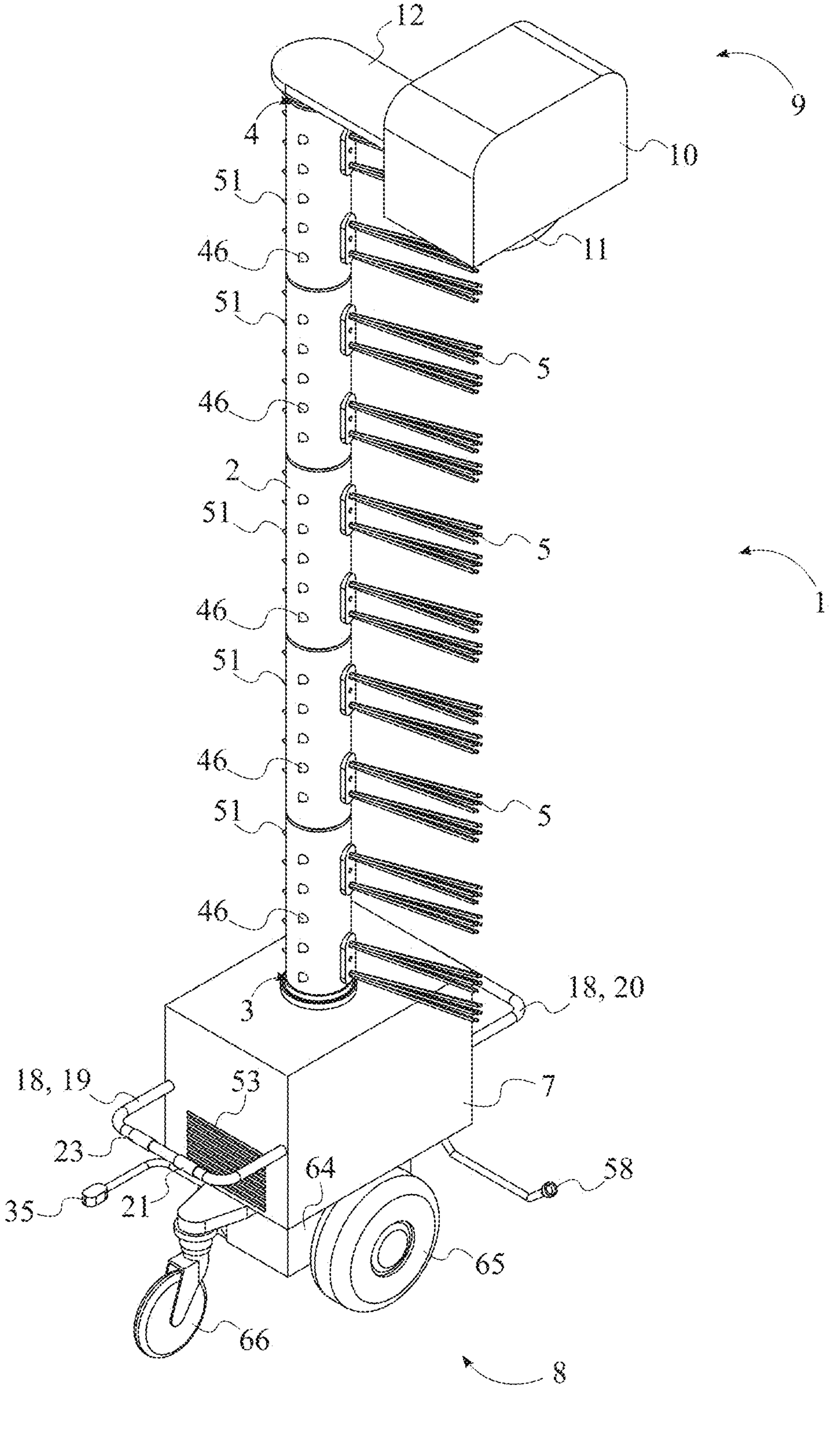
FIG. 4 is a top front perspective view thereof, wherein the at least one brush assembly is shown without an operator chariot.
Figure 5:
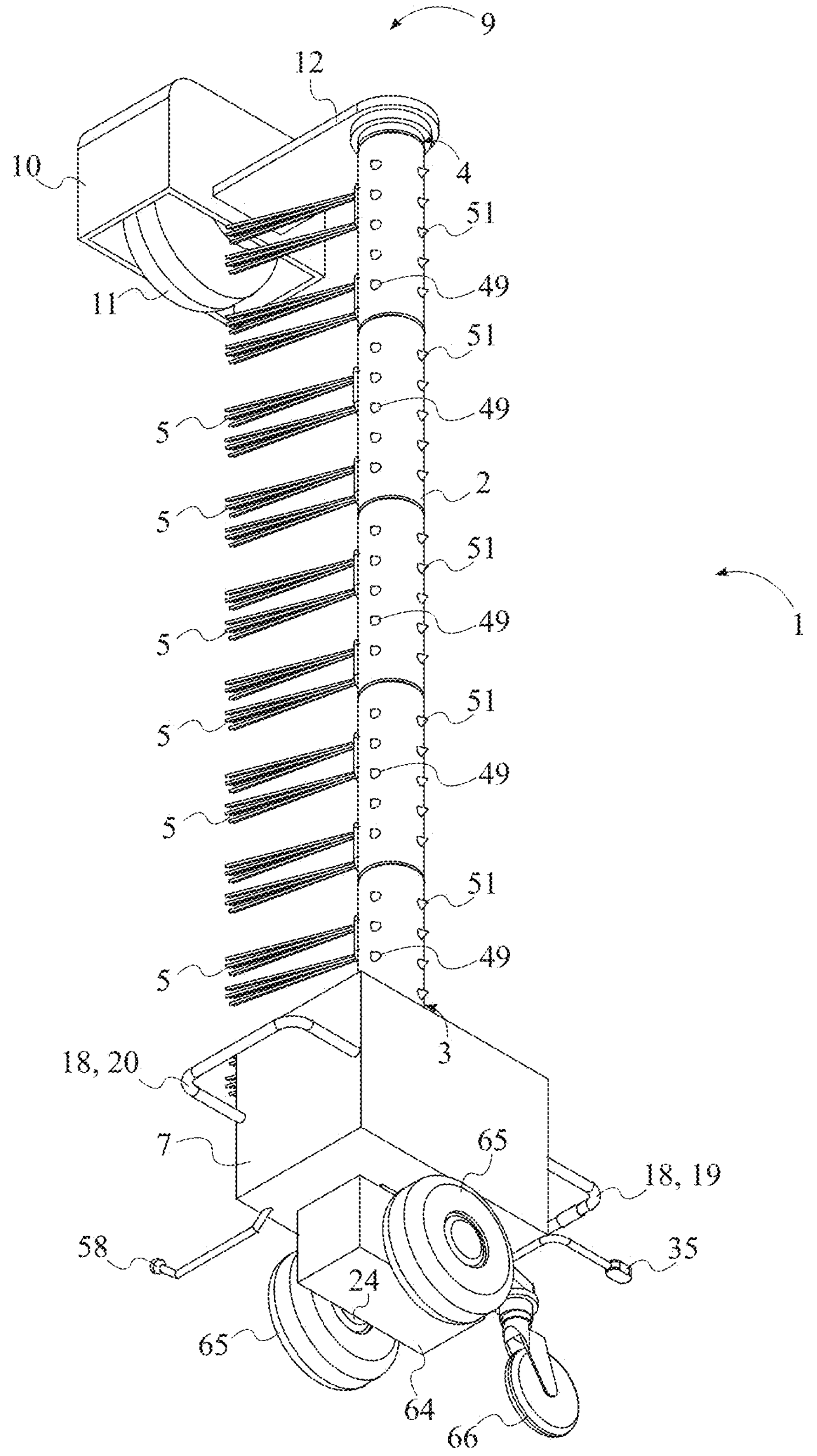
FIG. 5 is a bottom rear perspective view thereof.
Figure 6:
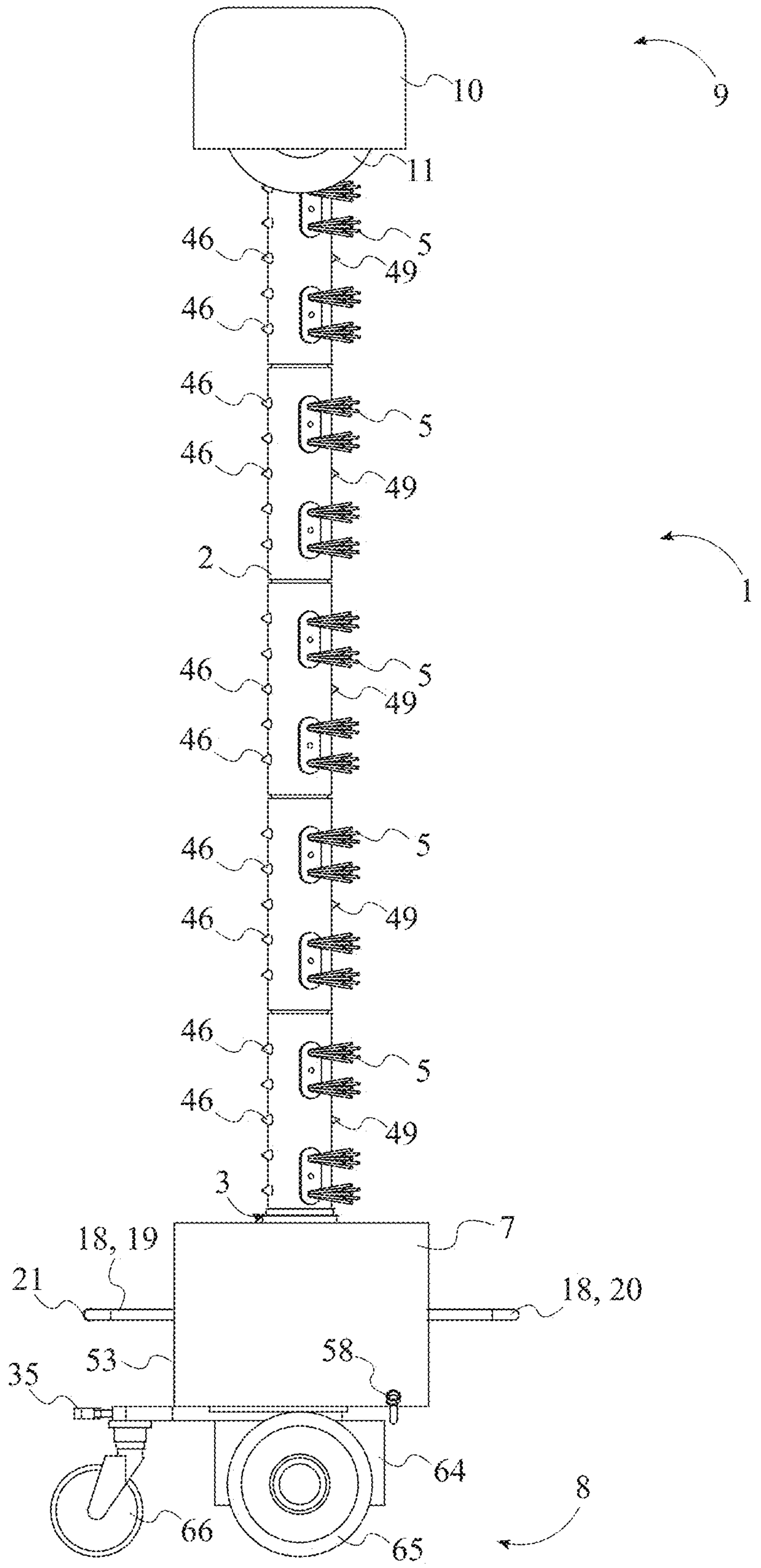
FIG. 6 is a side view thereof.
Figure 7:
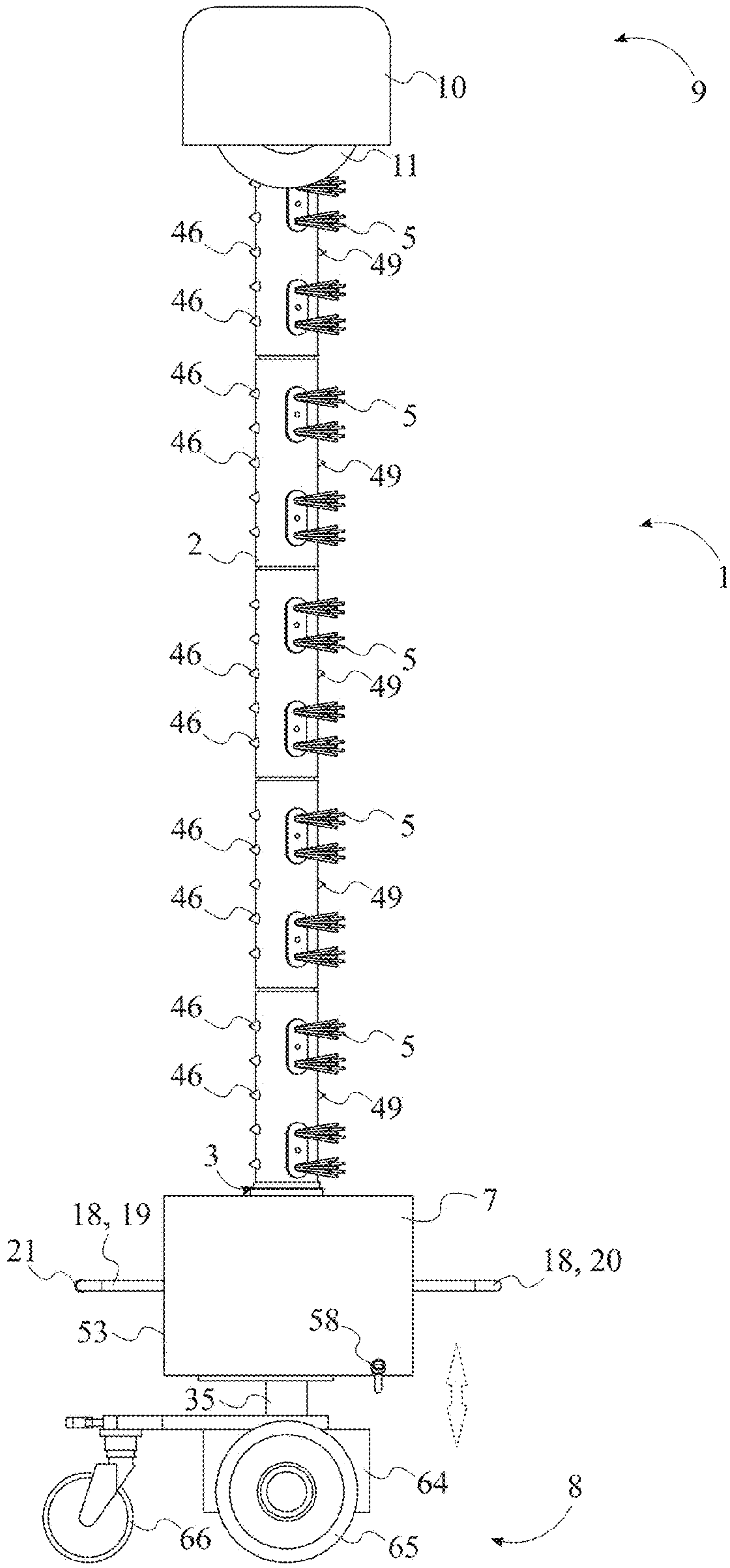
FIG. 7 is a side view thereof, wherein a base structure is shown elevated by a base lifting mechanism.
Figure 8:
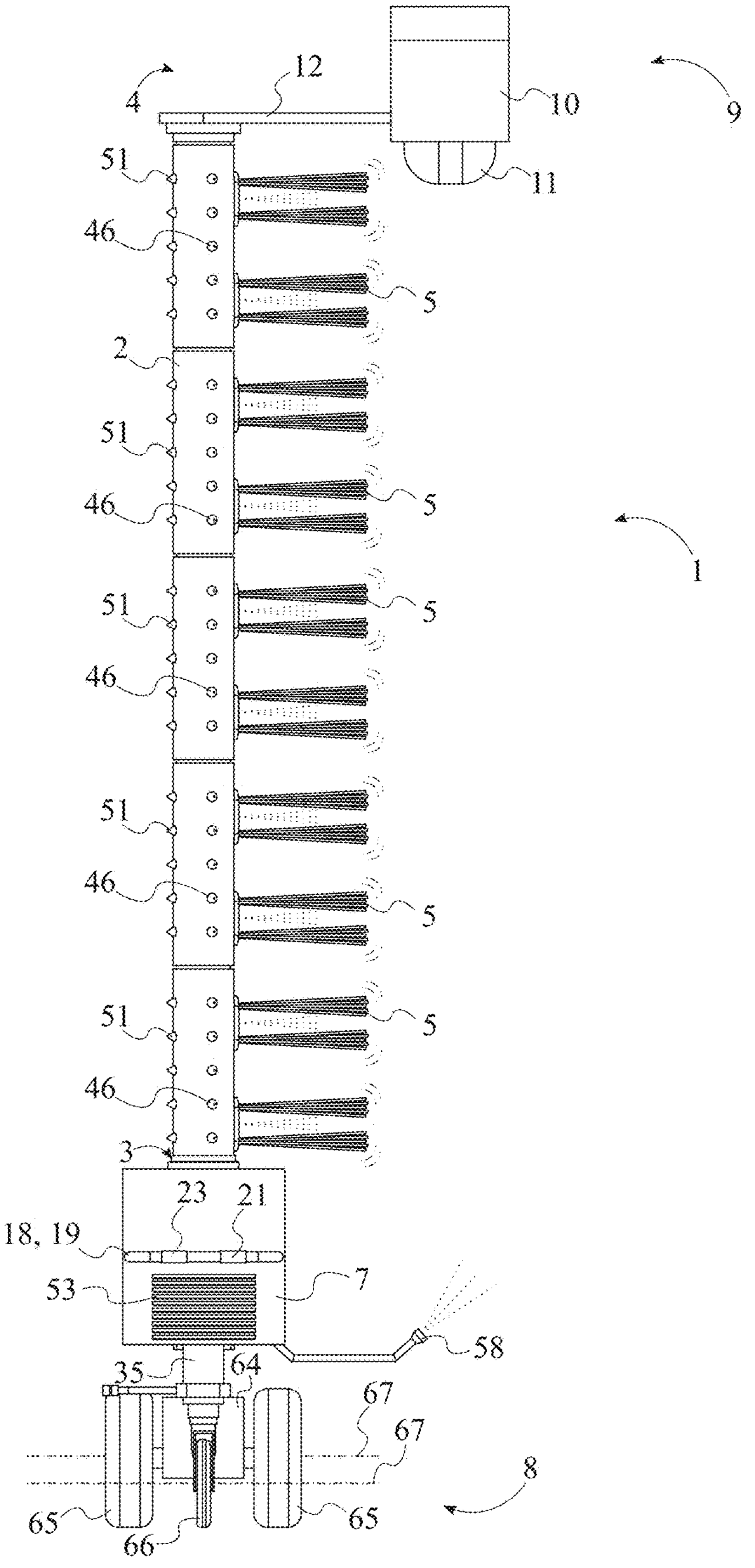
FIG. 8 is a front view thereof.
Figure 9:
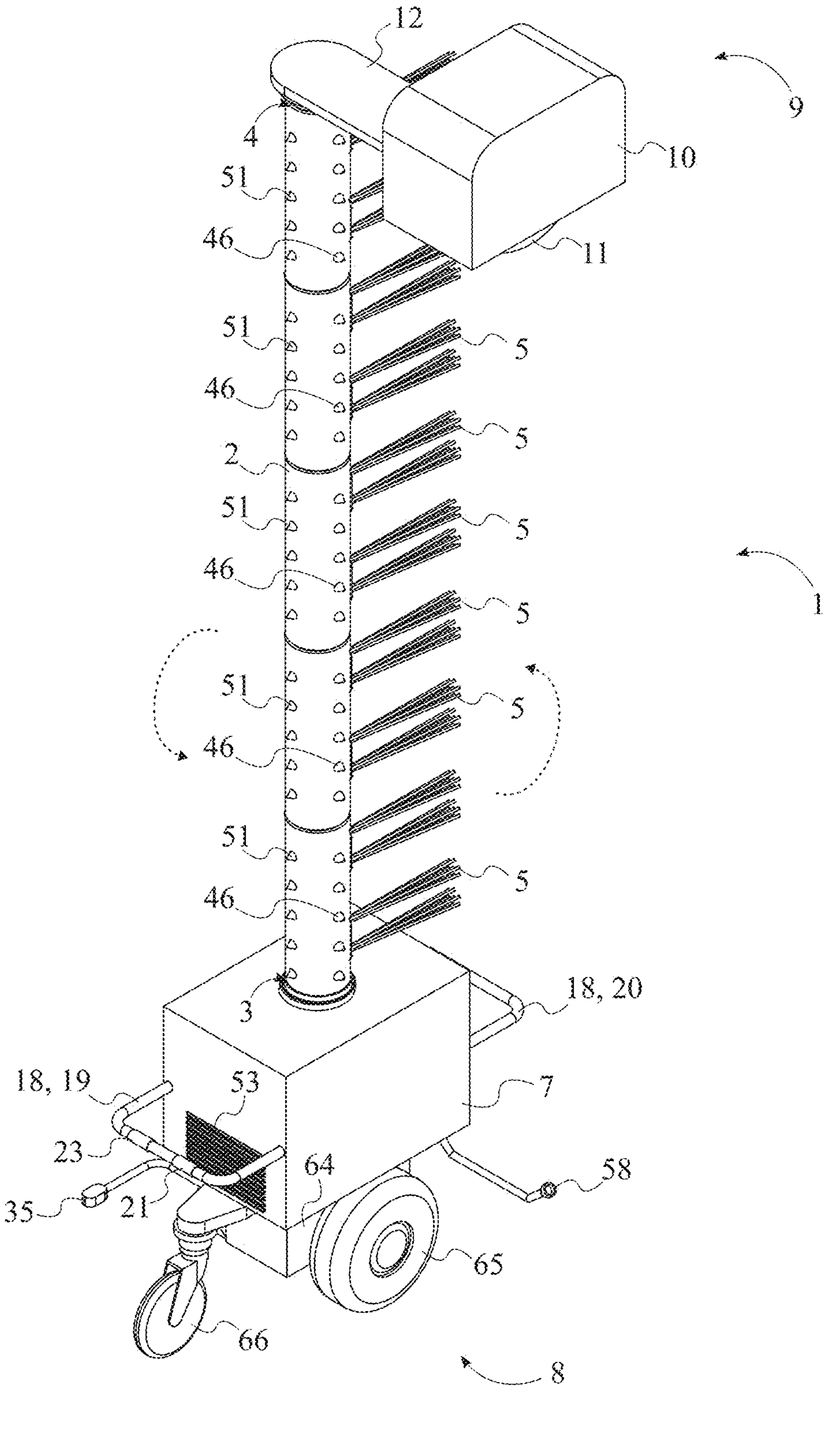
FIG. 9 is a top front perspective view thereof, wherein the support column of the at least one brush assembly is shown rotated.
Figure 10:
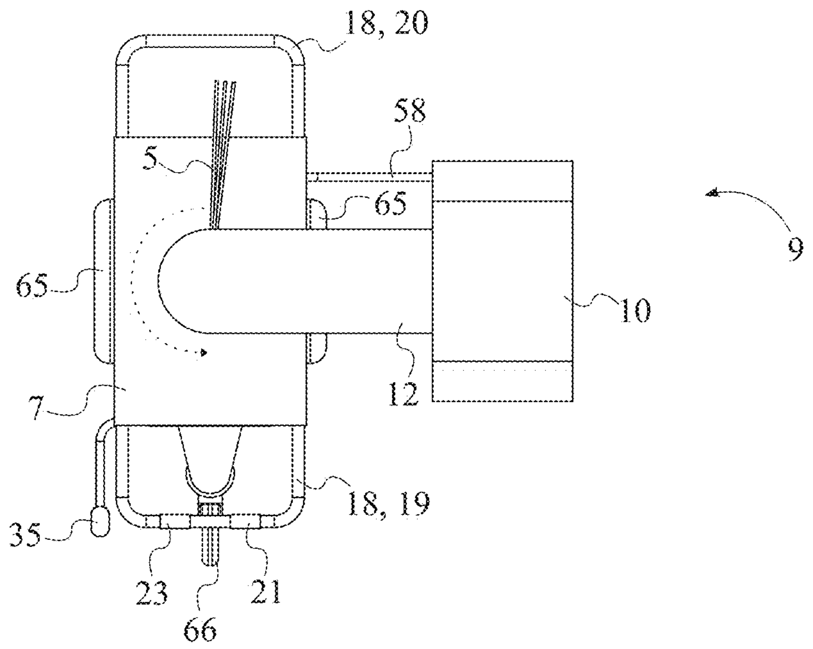
FIG. 10 is a top view thereof.
Figure 11:
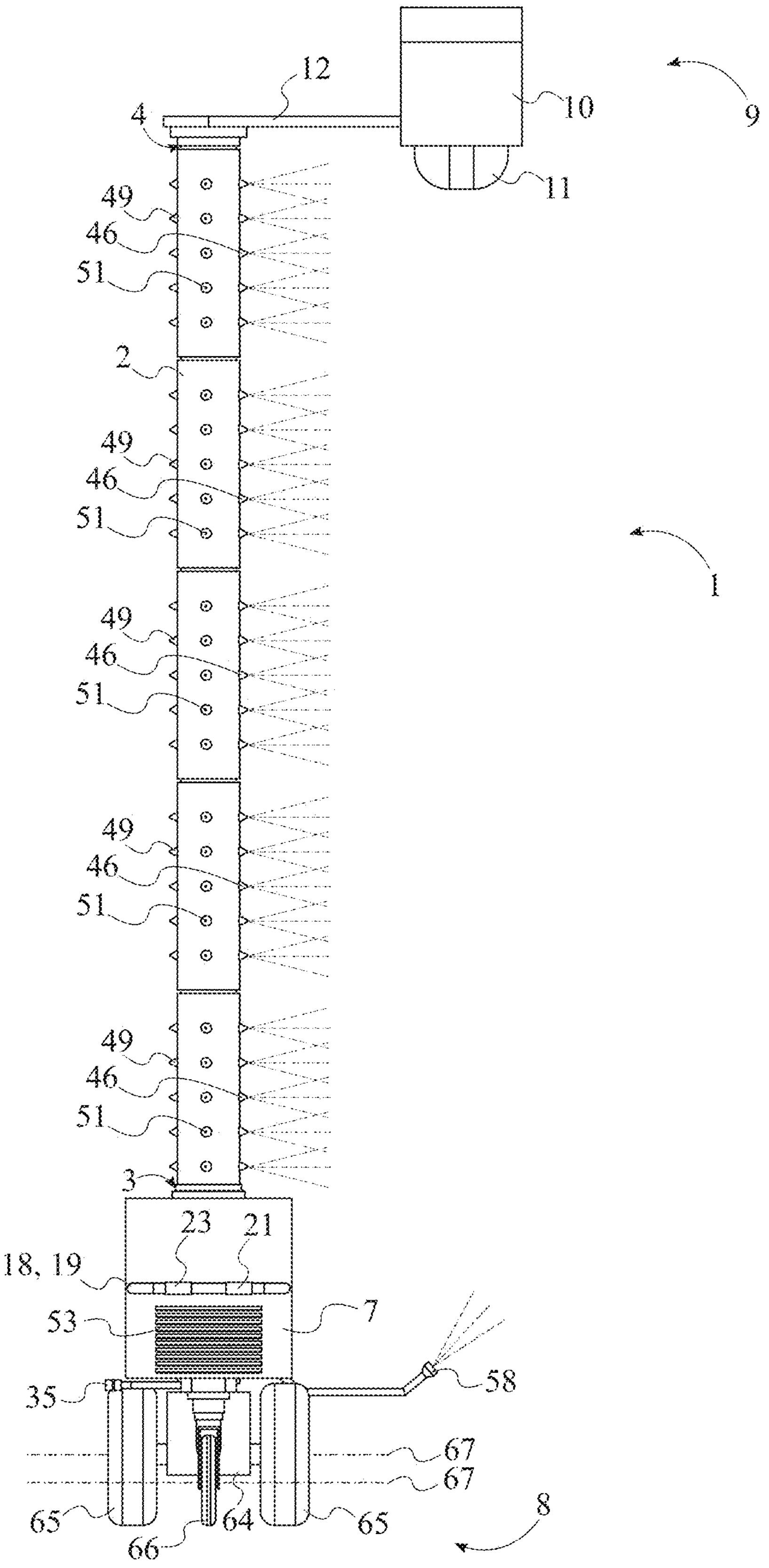
FIG. 11 is a front view thereof.
Figure 12:
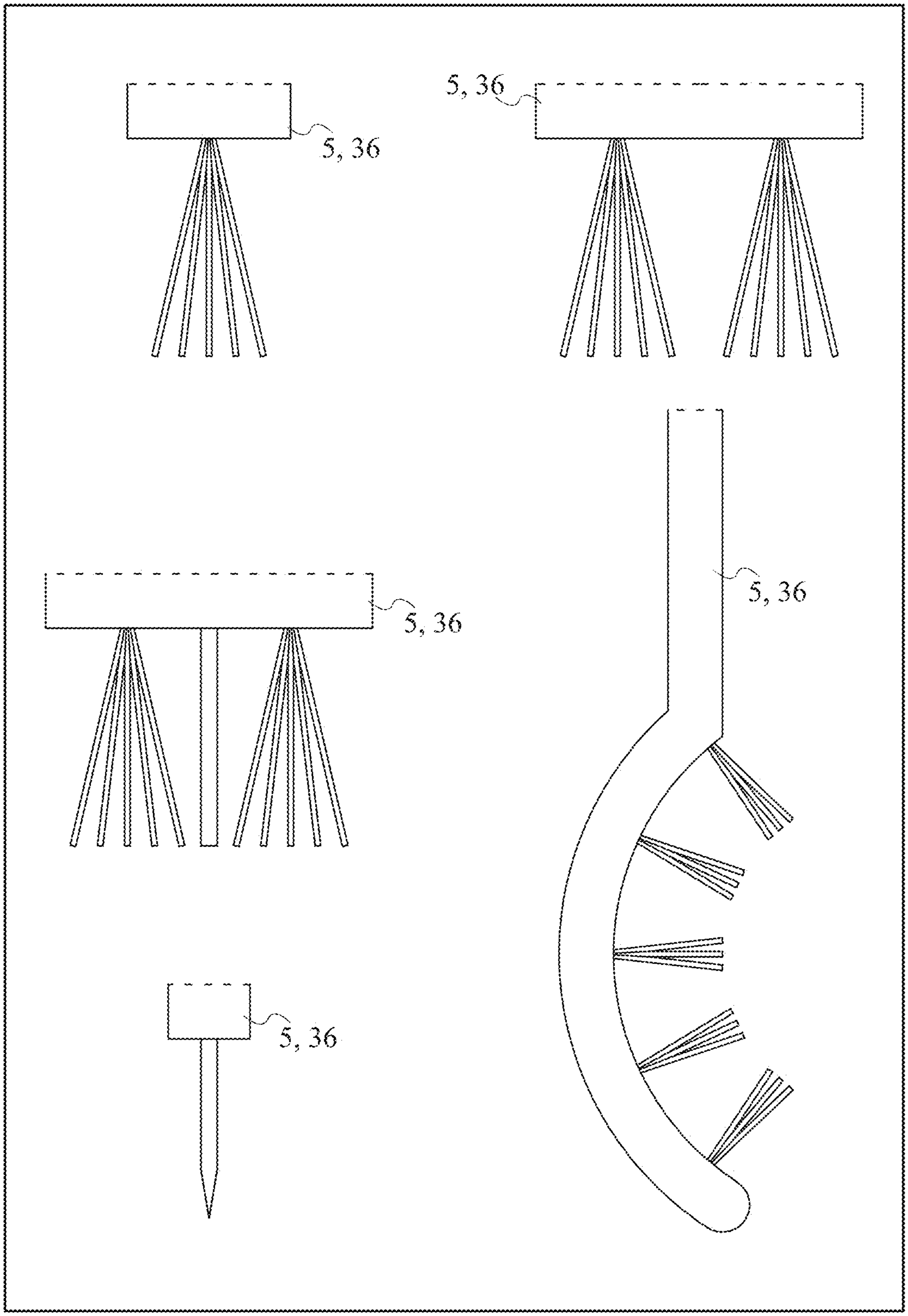
FIG. 12 is a schematic view showing the interchangeable bristle sets of the present invention.
Figure 13:
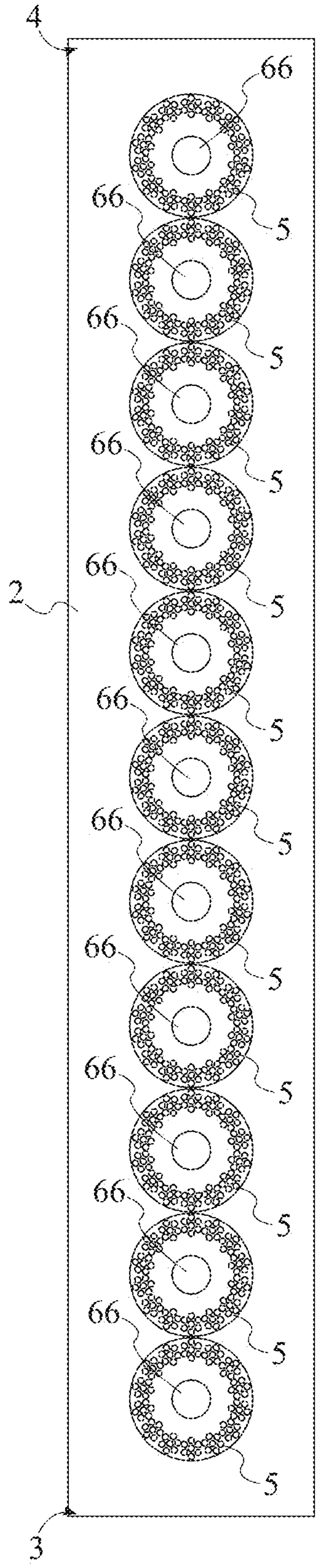
FIG. 13 is a schematic view showing an alternate embodiment of the bristle sets of the present invention.

As can be seen in FIGS. 1 through 3, in embodiments where the at least one drive system 22 is implemented, the present invention may further comprise an operator chariot 39. The operator chariot 39 provides a structure the user can ride on when the base structure 7 is moved by the at least one drive system 22. For example, the operator chariot 39 can be an elevated platform the user can stand on while driving the at least one brush assembly 1. To do so, the operator chariot 39 is laterally connected to the wheel assembly 8, adjacent to the steering assembly 18, so that the operator chariot 39 can be safely ridden by the user. In other embodiments, different supporting structures can be provided for the user to safely drive the at least one brush assembly 1.

Figure 14:
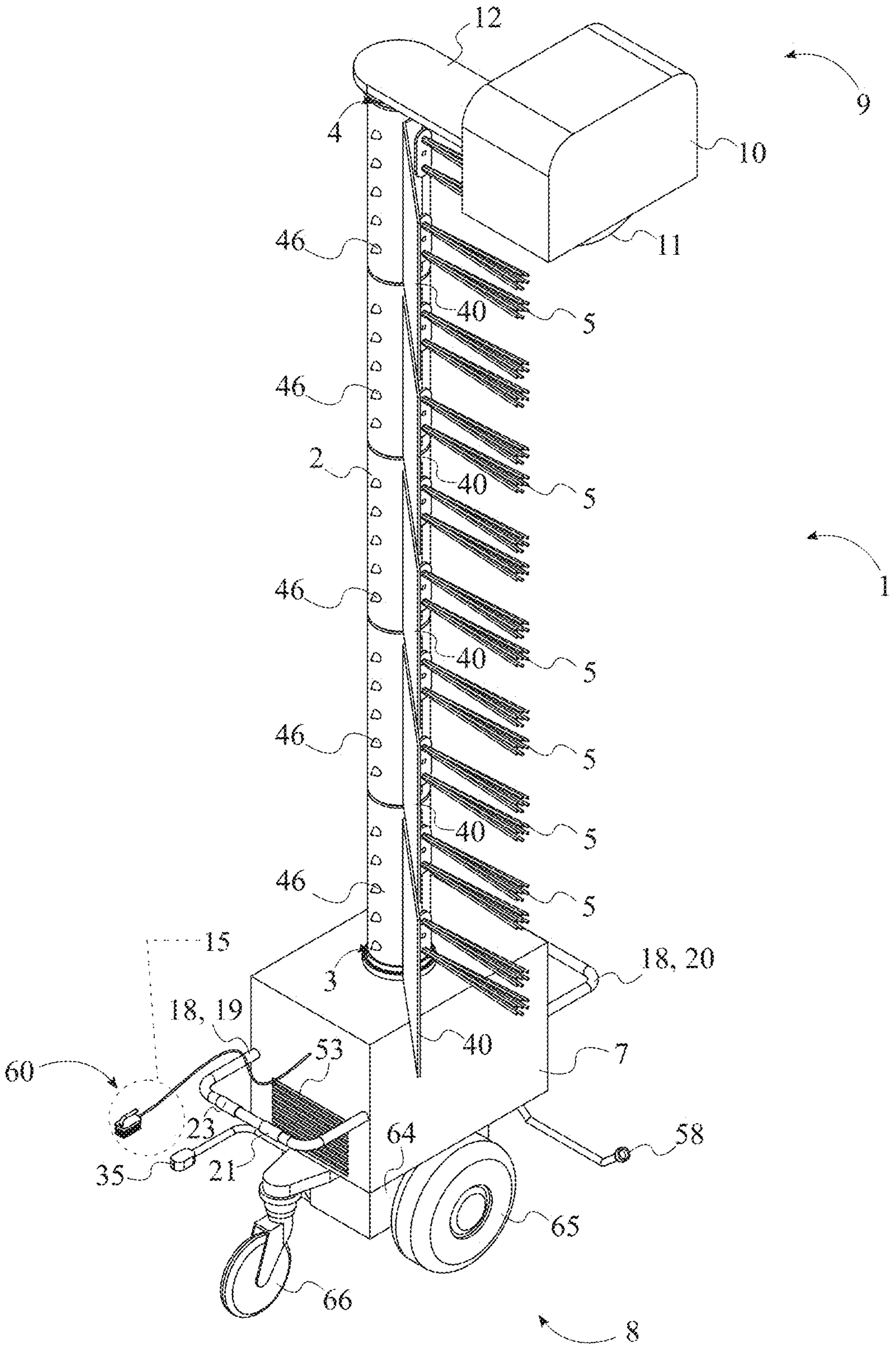
FIG. 14 is a top front perspective view thereof, wherein the at least one brush assembly is shown with splash guards and a handheld brush.
Figure 15:
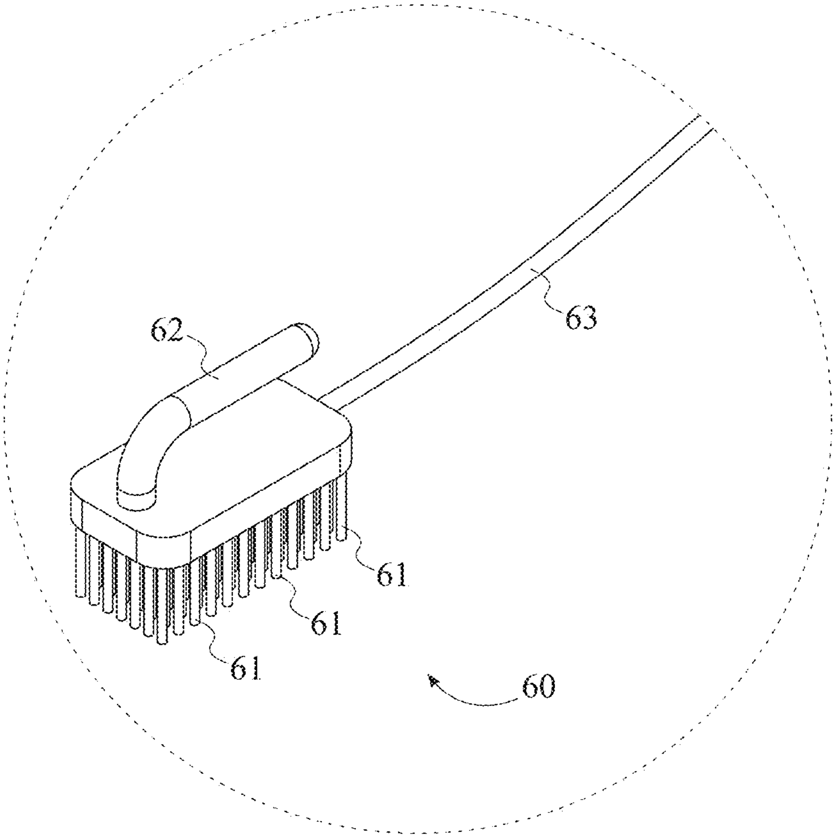
FIG. 15 is a magnified view of the handheld brush shown in FIG. 14.
Figure 16:
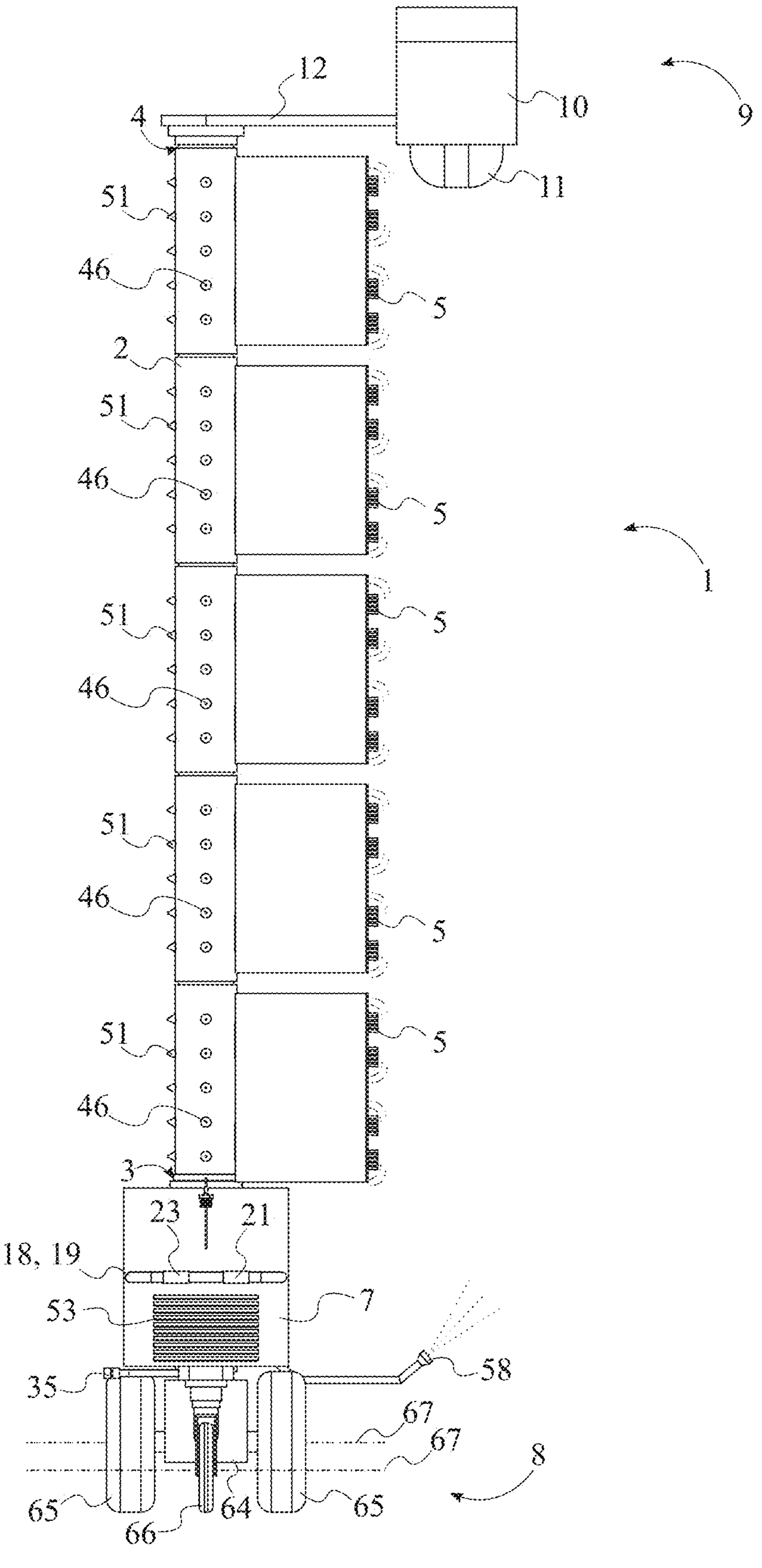
FIG. 16 is a front view thereof.

As can be seen in FIGS. 14 through 16, to protect the user from backsplash resulting from the plurality of bristle sets 5 cleaning the trailer exterior surfaces, the present invention may further comprise a plurality of splash guards 40. The plurality of splash guards 40 prevent the user from getting wet or exposed to the cleaning products being used to clean the trailer. To do so, each of the plurality of splash guards 40 is laterally connected to the support column 2 to secure the plurality of splash guards 40 to the support column 2. In addition, each of the plurality of splash guards 40 is positioned adjacent to at least one corresponding bristle set of the plurality of bristle sets 5. In other words, a splash guard can be arranged to cover one or more bristle sets, and the user can arrange the plurality of splash guards 40 to cover the desired area that the user is most likely to be splashed. In other embodiments, different safety devices can be implemented to protect the user.

Figure 23:
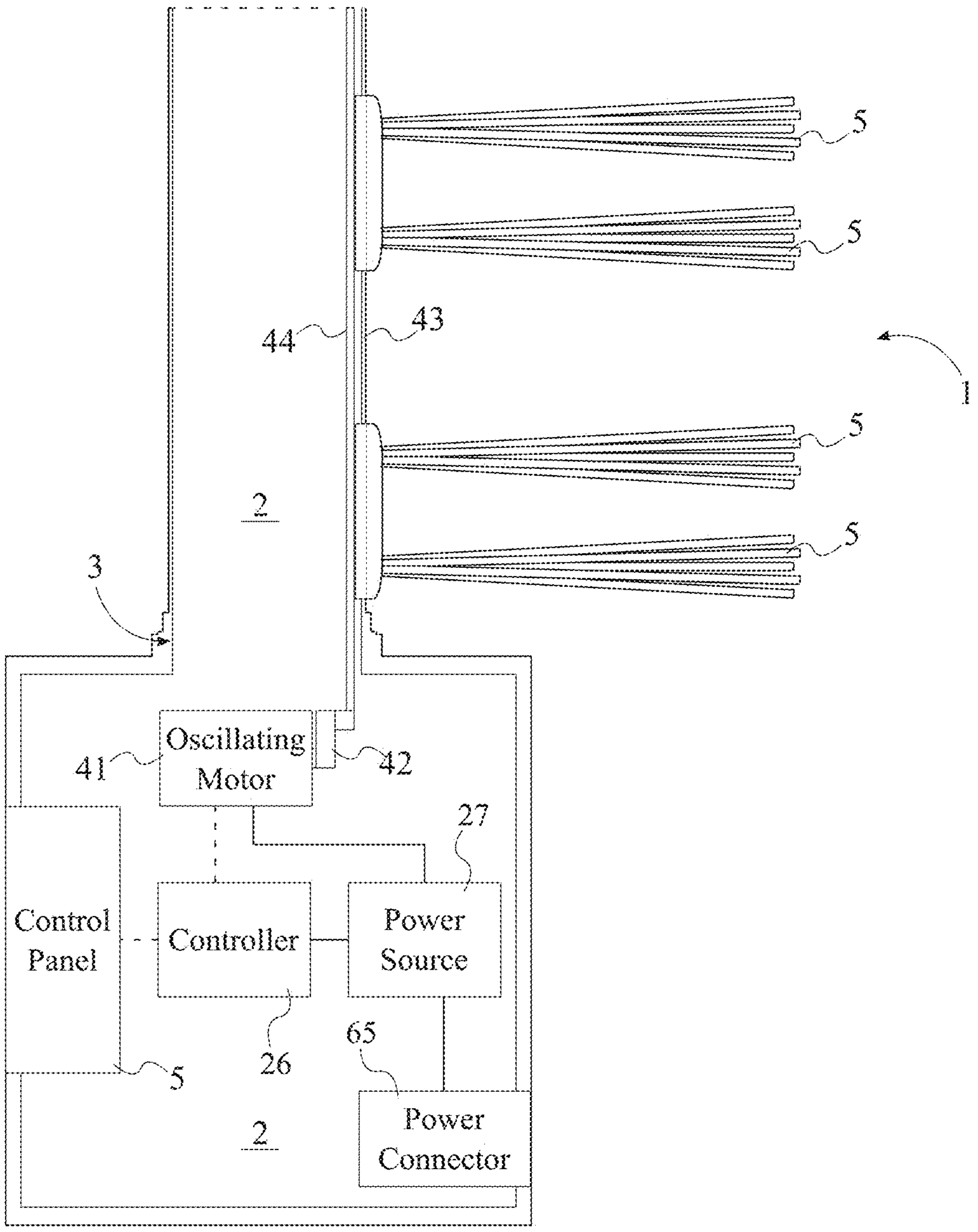
FIG. 23 is a schematic view showing an oscillator motor of the present invention, wherein the electronic connections are shown as dotted path lines, and wherein the electrical connections are shown as dashed path lines.

As previously discussed, the present invention can be operated manually by pushing onto the base structure 7 and moving the plurality of bristle sets 5 against the trailer's exterior surfaces. However, the present invention can also be operated semi-automatically or can be set to operate automatically to clean the exterior surfaces of the trailer. For example, the user can choose the plurality of bristle sets 5 to oscillate, vibrate, or rotate according to the level of cleaning needed. As can be seen in FIG. 23, the present invention may further comprise a control panel 25, an oscillating motor 41, and a reciprocating cam 42. The control panel 25 enables the user to input the commands that dictate the automatic or semiautomatic operation of the plurality of bristle sets 5. The controller 26 processes the user inputs from the control panel 25 and transmit the processed commands to the appropriate components. The oscillating motor 41 can be configured through the controller 26 according to the user's desired settings. The reciprocating cam 42 facilitates the oscillating movement of the plurality of bristle sets 5. Further, the support column 2 comprises an elongated fixed portion 43 and an elongated free portion 44. The elongated fixed portion 43 corresponds to the portion of the support column 2 that remains static during operation, while the elongated free portion 44 can be moved by the oscillating motor 41 through the reciprocating cam 42.

The present invention can be arranged as follows. As can be seen in FIG. 23, the control panel 25 is laterally mounted onto the base structure 7 so that the control panel 25 is accessible to the user. Further, the oscillating motor 41 and the reciprocating cam 42 are mounted within the base structure 7 to protect each component from the surroundings. Further, the elongated fixed portion 43 and the elongated free portion 44 are slidably mounted along each other to allow the control movement of the elongated free portion 44 within the elongated fixed portion 43. The plurality of bristle sets 5 is also laterally mounted to the elongated free portion 44 to secure each bristle set to the elongated free portion 44. Further, the elongated free portion 44 is operatively coupled to the oscillating motor 41 by the reciprocating cam 42, wherein the rotational motion produced by the oscillating motor 41 is used to drive an oscillating linear motion of the reciprocating cam 42, and wherein the oscillating linear motion of the reciprocating cam 42 is used to drive an oscillating linear motion of the elongated free portion 44. In other words, as the oscillating motor 41 generates a rotational motion, the reciprocating cam 42 converts the rotational motion to an oscillating linear motion that moves the elongated free portion 44 in a corresponding oscillating linear motion along the elongated fixed portion 43. This way, each bristle set is oscillated in a controlled manner to increase the efficiency of the trailer cleaning capabilities of the present invention. Furthermore, the controller 26 is electronically connected to the control panel 25 and the oscillating motor 41 to enable the transmission of the appropriate operating signals. In addition, the power source 27 is electrically connected to the oscillating motor 41 to provide the power necessary for the operation of the oscillating motor 41.

Figure 24:
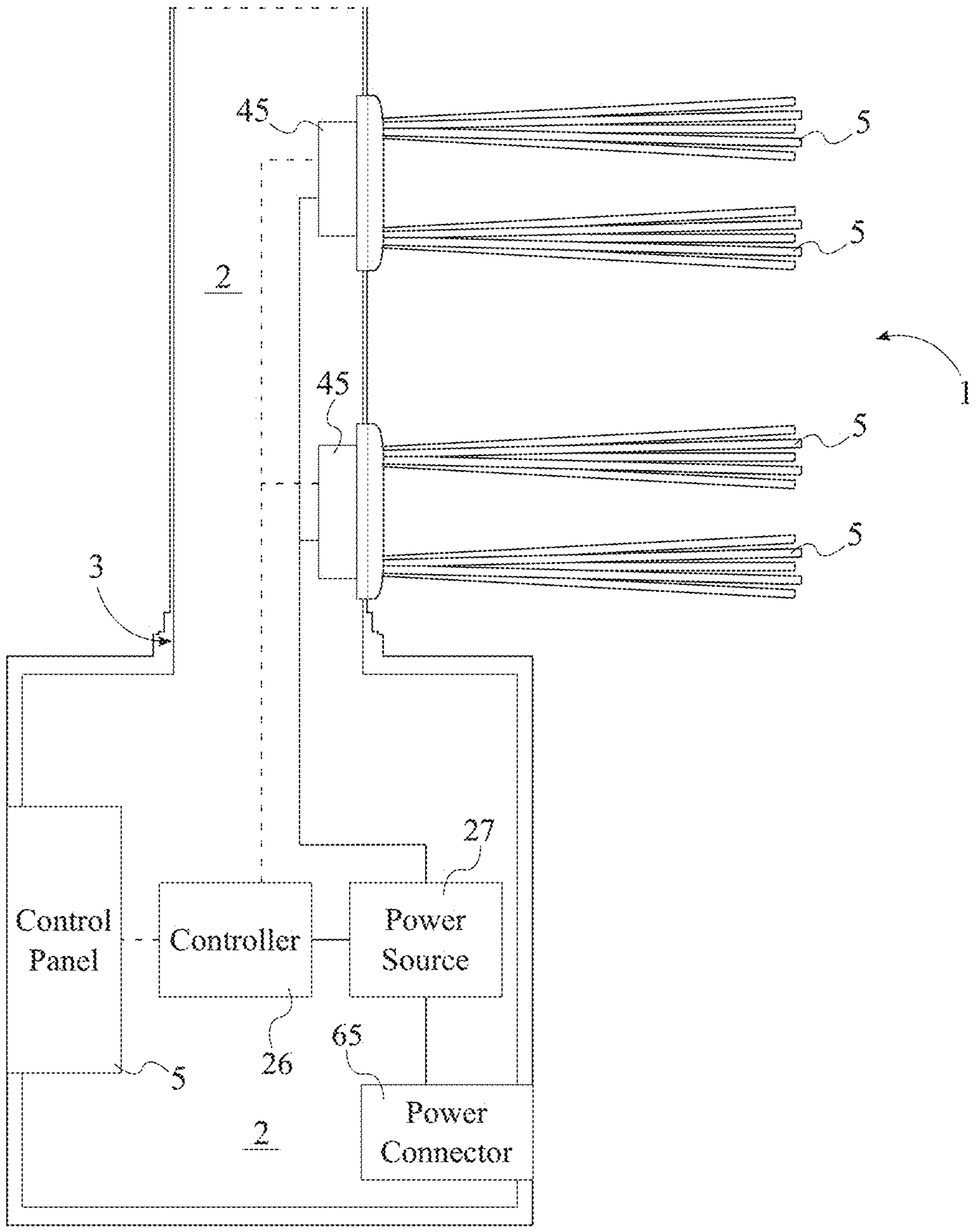
FIG. 24 is a schematic view showing the agitation mechanism of the present invention as piezoelectric modules, wherein the electronic connections are shown as dashed path lines, and wherein the electrical connections are shown as solid path lines.

In another embodiment, the user can choose for the plurality of bristle sets 5 to vibrate to clean the trailer's exterior surfaces more gently. As can be seen in FIG. 24, in this embodiment, the agitation mechanism 13 includes a plurality of piezoelectric modules 45 designed to transmit vibrational forces to the plurality of bristle sets 5. To do so, each of the plurality of piezoelectric modules 45 is integrated into the support column 2 to secure the plurality of piezoelectric modules 45 within the support column 2. In addition, each of the plurality of piezoelectric modules 45 is in vibrational communication with a corresponding bristle set of the plurality of bristle sets 5. In other words, each bristle set can be vibrated by a piezoelectric module to improve the cleaning of the trailer surfaces adjacent to each bristle set. Moreover, the controller 26 is electronically connected to the control panel 25 and the plurality of piezoelectric modules to enable the user to manage the operation of the plurality of piezoelectric modules 45 according to the user inputs on the control panel 25. Further, the power source 27 is electrically connected to the plurality of piezoelectric modules 45 to provide the voltage necessary for the operation of the plurality of piezoelectric modules 45. In other embodiments, the present invention may utilize different agitation mechanism 13s that move the plurality of bristle sets 5 in a desired pattern for more efficient cleaning of the trailer's exterior surfaces.

Figure 20:
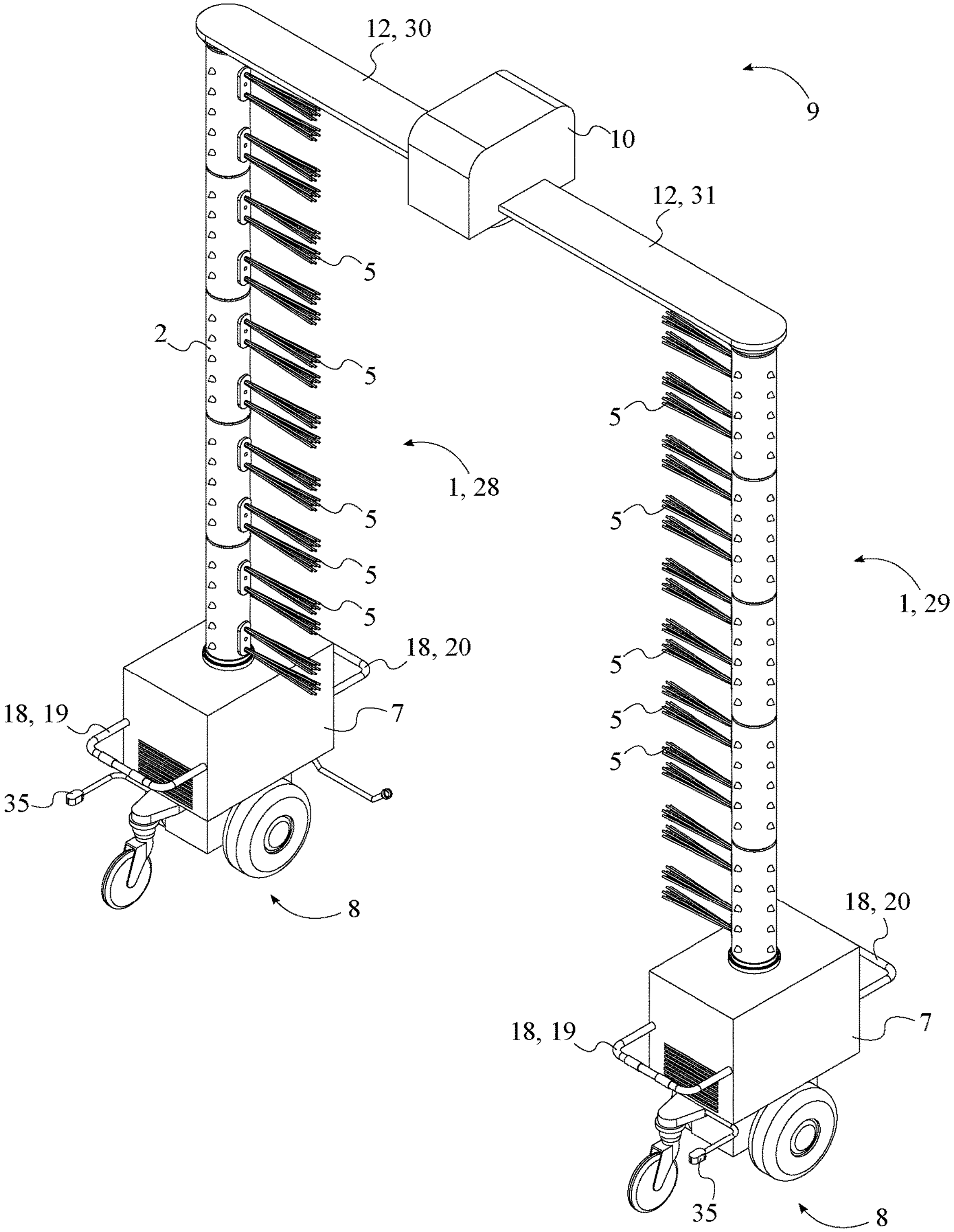
FIG. 20 is a front top perspective view thereof, wherein the at least one extension arm of the present invention is shown as a first extension arm and a second extension arm.
Figure 21:
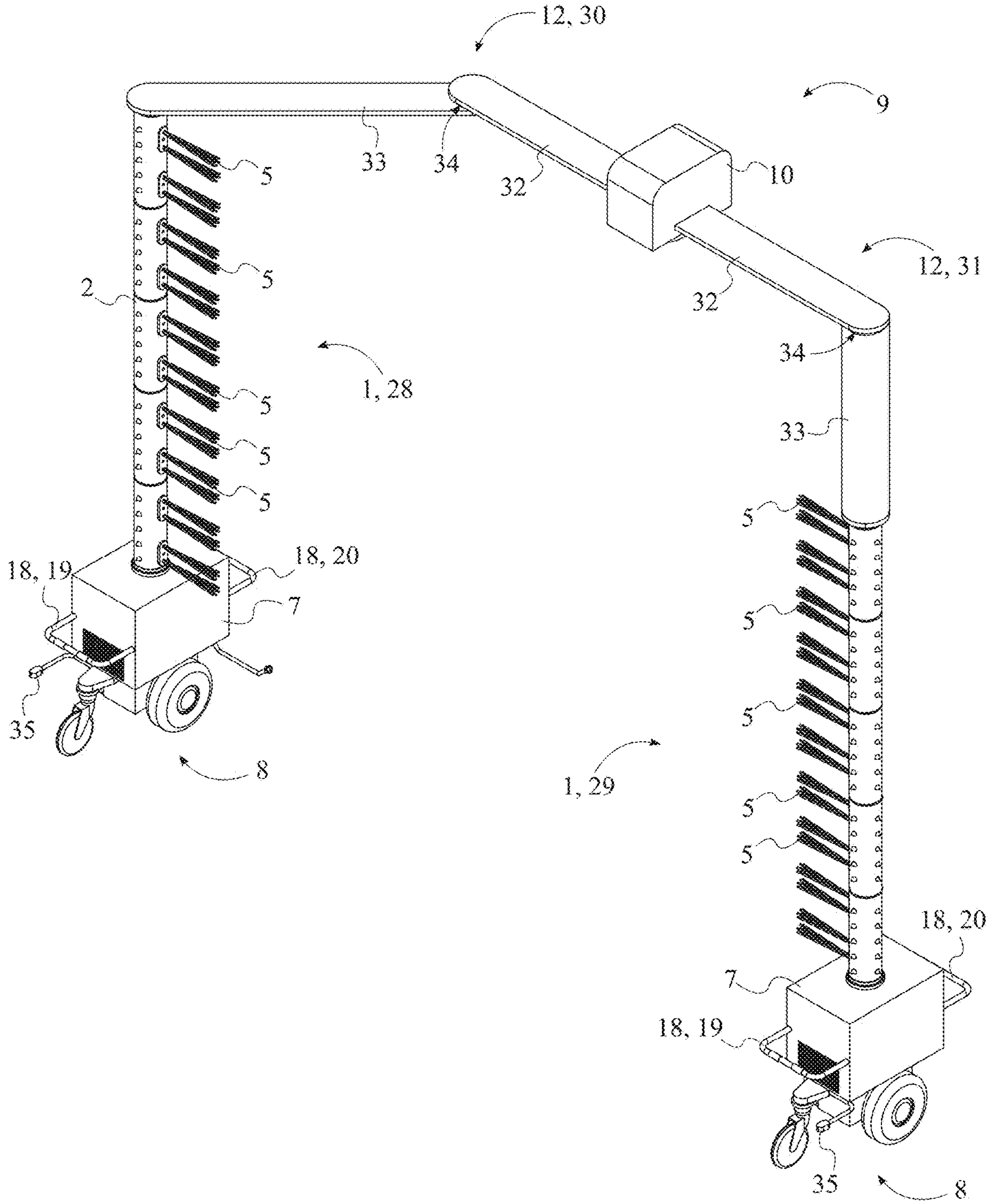
FIG. 21 is a front rear perspective view thereof, wherein the first extension arm and the second extension arm of the present invention are shown with a distal arm section, a proximal arm section, and an arm joint.

The at least one brush assembly 1 enables the user to clean a trailer's lateral wall at a time. However, in some embodiments, the present invention can be configured to enable the cleaning of multiple surfaces at a time. As can be seen in FIGS. 20 and 21, the at least one brush assembly 1 may be a first brush assembly 28 and a second brush assembly 29 that can be positioned adjacent to the opposing lateral walls of the trailer for simultaneous cleaning. The at least one extension arm 12 may also be a first extension arm 30 and a second extension arm 31 to keep the first brush assembly 28 connected to the second brush assembly 29. The first extension arm 30 is laterally connected to the carriage body 10 to secure the first extension arm 30 to the carriage body 10. Likewise, the second extension arm 31 is laterally connected to the carriage body 10, opposite to the first extension arm 30, to secure the second extension arm 31 to the carriage body 10. Further, the second column end 4 of the first brush assembly 28 is terminally mounted to the first extension arm 30, opposite the carriage body 10, to position the first brush assembly 28 offset to the carriage body 10. Similarly, the second column end 4 of the second brush assembly 29 is terminally mounted to the second extension arm 31, opposite the carriage body 10. Thus, the second brush assembly 29 is positioned offset to the carriage body 10 opposite to the first brush assembly 28, enabling the user to simultaneously clean two opposite trailer walls.

In addition to enabling the simultaneous cleaning of opposing trailer walls, the present invention can also enable simultaneous cleaning of adjacent trailer walls. As can be seen in FIGS. 20 and 21, the first extension arm 30 and the second extension arm 31 may each comprise a distal arm section 32, a proximal arm section 33, and an arm joint 34. The distal arm section 32 and the proximal arm section 33 enable the corresponding extension arm to be bent into different configurations. The arm joint 34 facilitates the bending of the corresponding extension arm. The proximal arm section 33 is laterally connected to the carriage body 10 to secure the proximal arm section 33 to the carriage body 10. The distal arm section 32 is pivotably connected to the proximal arm section 33 by the arm joint 34 to enable the reconfiguration of the corresponding arm. The second column end 4 of the first brush assembly 28 is terminally mounted to the distal arm section 32 of the first extension arm 30, opposite to the proximal arm section 33 of the first extension arm 30, to secure the first brush assembly 28 to the first extension arm 30. The second column end 4 of the second brush assembly 29 is terminally mounted to the distal arm section 32 of the second extension arm 31, opposite to the proximal arm section 33 of the second extension arm 31, to secure the second brush assembly 29 to the second extension arm 31. Thus, the user can reposition the first brush assembly 28 to be positioned closer to the second brush assembly 29 so that the user can simultaneously clean two adjacent trailer walls. In other embodiments, the present invention can provide multiple accessories that further aid in the cleaning of the trailer's exterior surfaces or other truck attachments.

The at least one brush assembly 1 can be equipped with means to dispense water and other cleaning products to facilitate the cleaning of the desired trailer. In one embodiment, the present invention can be designed to dispense a soap solution to help remove dirt and debris from the trailer's surfaces. As can be seen in FIGS. 1 through 11 and 25, the present invention may further comprise a plurality of soap nozzles 46, at least one soap reservoir 47, and a liquid pump 48. The plurality of soap nozzles 46 enables the controlled dispensing of soap solution onto the target trailer surfaces. The at least one soap reservoir 47 retains an amount of soap solution that can be dispensed by the plurality of soap nozzles 46. The liquid pump 48 enables the movement of the soap solution from the at least one soap reservoir 47 to the plurality of soap nozzles 46 for dispensing. The present invention can be arranged as follows. The at least one soap reservoir 47 and the liquid pump 48 are mounted within the base structure 7 so that the components can be moved inside the base structure 7. Further, the plurality of soap nozzles 46 is laterally integrated along the support column 2 to secure each soap nozzle to the support column 2. Further, the plurality of soap nozzles 46 is positioned offset to the plurality of bristle sets 5 about the support column 2 so that the dispensing of the soap solution can be done separately. The at least one soap reservoir 47 is in fluid communication with each of the plurality of soap nozzles 46 through the liquid pump 48 to allow the movement of the soap solution from the at least one soap reservoir 47 to the plurality of soap nozzles 46. Further, the controller 26 is electronically connected to the liquid pump 48 to enable the user to control the dispensing of the soap solution. In addition, the power source 27 is electrically connected to the liquid pump 48 to provide the power necessary for the operation of the liquid pump 48.

In another embodiment, the present invention can be designed to dispense water to help rinse the trailer's surfaces that have been treated by the soap solution. As can be seen in FIGS. 1 through 11 and 25, the present invention may further comprise a plurality of water nozzles 49 and at least one water reservoir 50. The plurality of water nozzles 49 enables the controlled dispensing of water onto the target trailer surfaces. The at least one water reservoir 50 retains an amount of water that can be dispensed by the plurality of water nozzles 49. In addition, the liquid pump 48 enables the movement of the water from the at least one water reservoir 50 to the plurality of water nozzles 49 for dispensing. The present invention can be arranged as follows. The at least one water reservoir 50 is mounted within the base structure 7 so that the at least one water reservoir 50 can be moved inside the base structure 7. Further, the plurality of water nozzles 49 is laterally integrated along the support column 2 to secure each water nozzle to the support column 2. Further, the plurality of water nozzles 49 is positioned offset to the plurality of bristle sets 5 about the support column 2 so that the dispensing of the water can be done separately. The at least one water reservoir 50 is in fluid communication with each of the plurality of water nozzles 49 through the liquid pump 48 to allow the movement of the water from the at least one water reservoir 50 to the plurality of water nozzles 49. Further, the controller 26 is electronically connected to the liquid pump 48 to enable the user to control the dispensing of the water. This way, the user can choose to dispense water or soap solution onto the trailer's surfaces to effectively clean the trailer.

Figure 17:
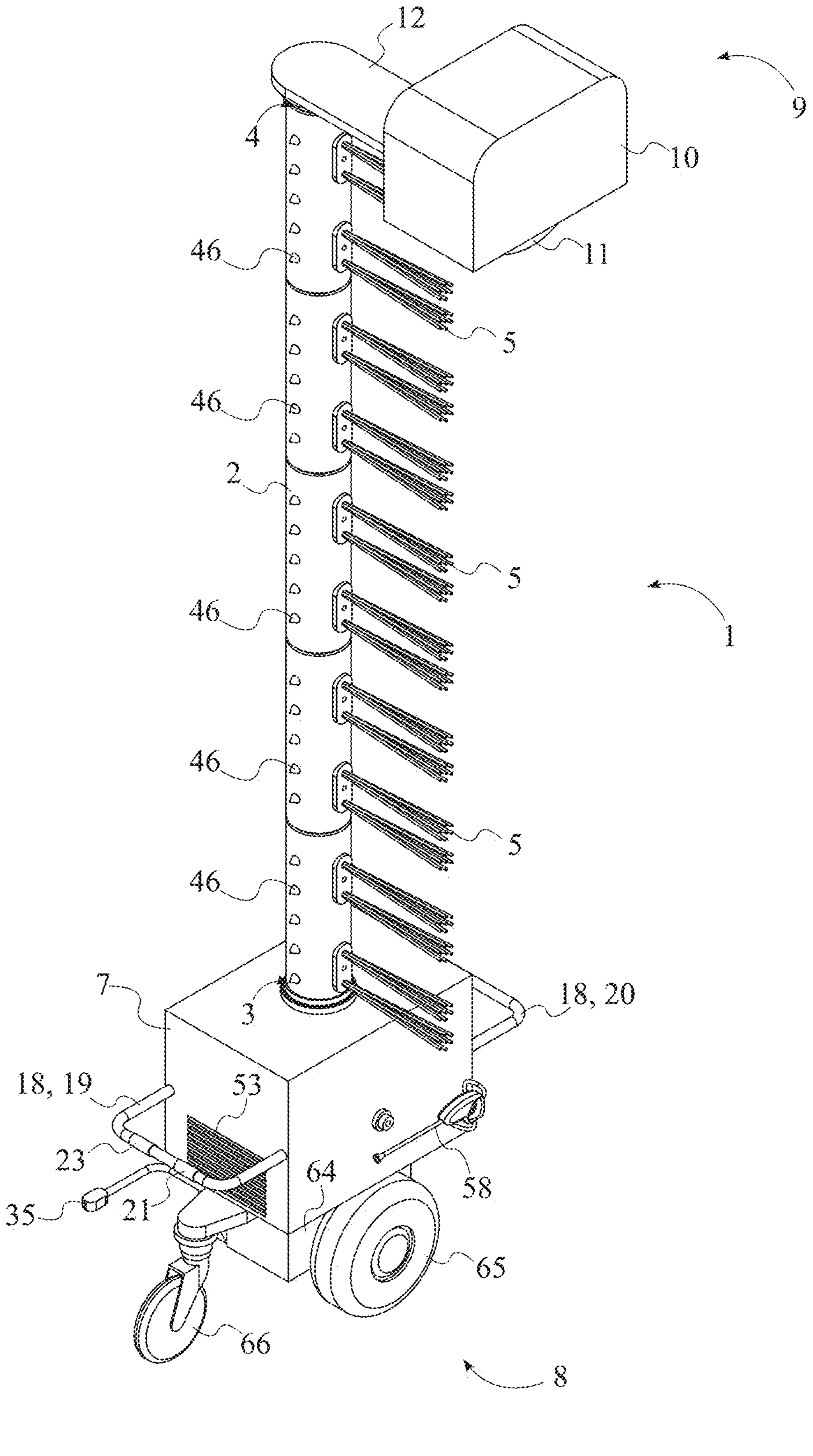
FIG. 17 is a top front perspective view showing an alternate embodiment of the undercarriage nozzle of the present invention.
Figure 18:
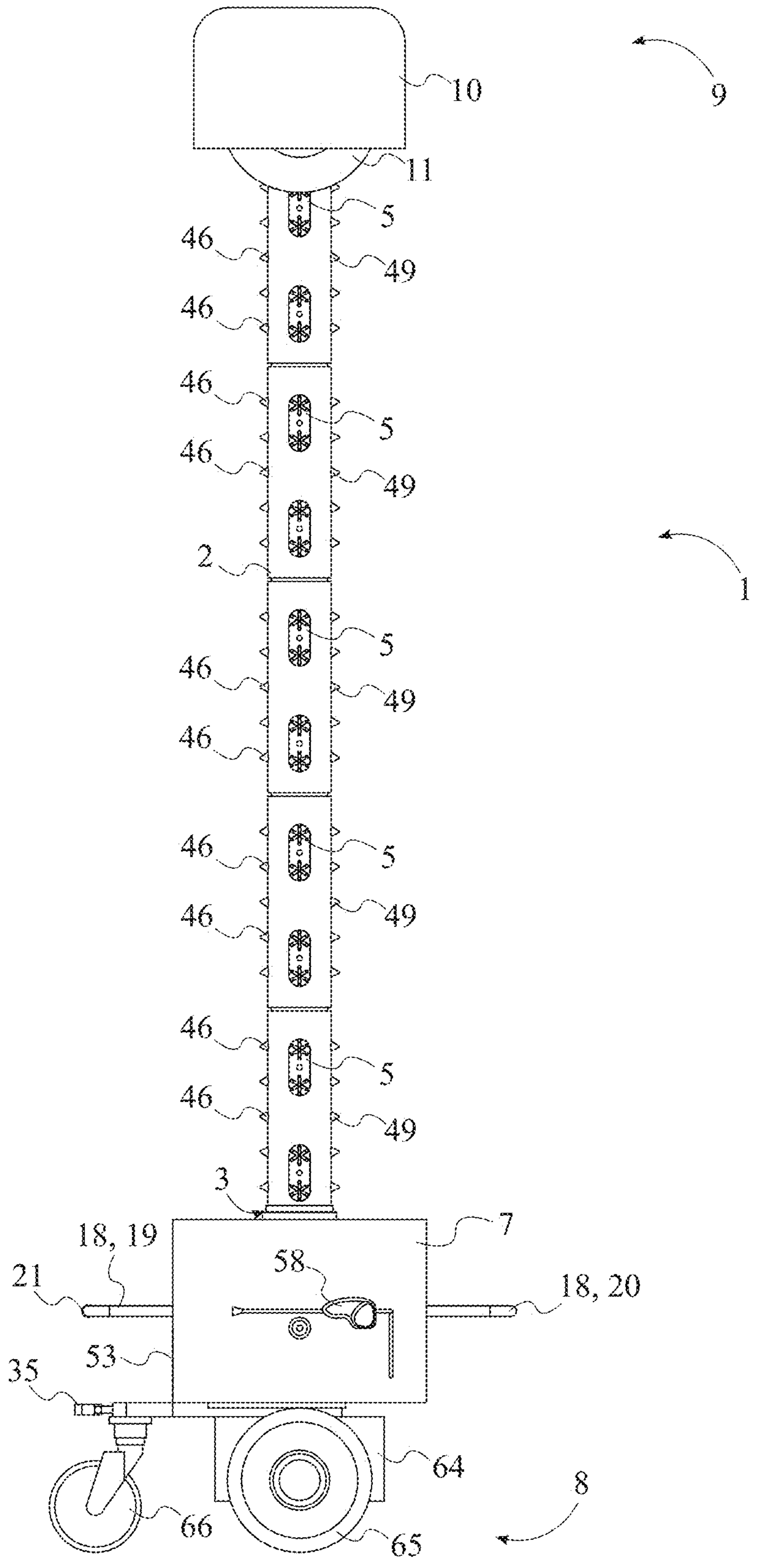
FIG. 18 is a side view thereof.
Figure 25:
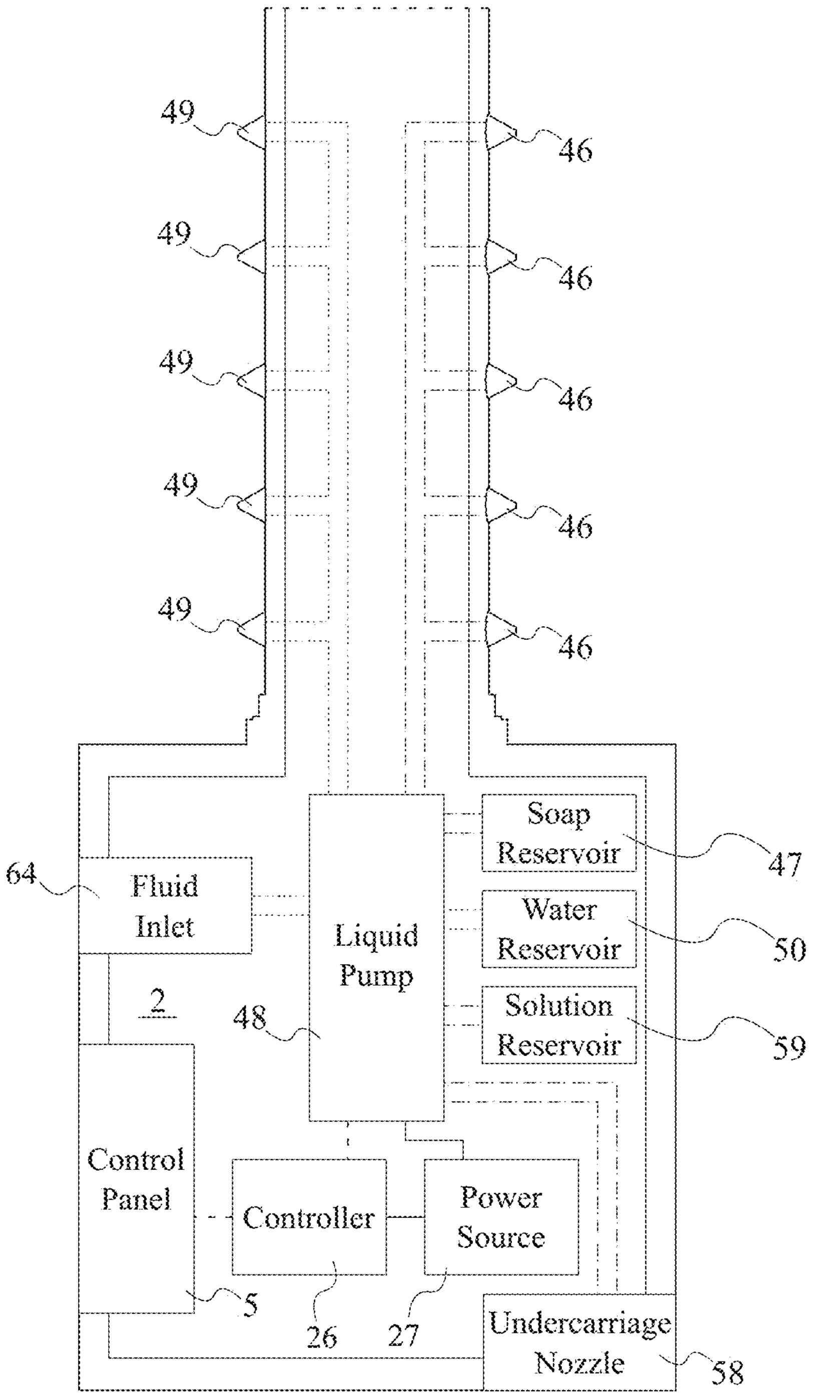
FIG. 25 is a schematic view showing water, soap solution, and cleaning solution mechanisms of the present invention, wherein the electronic connections are shown as dashed path lines, and wherein the electrical connections are shown as solid path lines.

In some embodiments, the present invention can utilize external sources of soap solution or water to clean the target trailer if the corresponding reservoirs are emptied out or if the user desires to utilize different cleaning fluids. As can be seen in FIGS. 17, 18, and 25, the present invention may further comprise at least one fluid inlet 64 that allows soap solution or water to flow into the base structure 7. The at least one fluid inlet 64 is designed to enable a hose or similar tubing devices to be connected to the liquid pump 52 so that the appropriate fluid can be dispensed by the different nozzles on the support column 2. Further, the at least one fluid inlet 64 is laterally integrated on the base structure 7 so that the at least one fluid inlet 64 can be accessed from the exterior of the base structure 7. In addition, the at least one fluid inlet 64 is in fluid communication with each of the plurality of water nozzles 49 and/or each of the plurality of soap nozzles 46 through the liquid pump 48. This way, the appropriate fluid is dispensed through the corresponding nozzles when the external source is connected to the at least one fluid inlet 64. In some embodiments, the at least one fluid inlet 64 can be several fluid inlets that allow different external sources to be connected to the present invention.

In another embodiment, the present invention can also be designed to help dry the trailer's surfaces after cleaning the trailer's surfaces. As can be seen in FIGS. 1 through 11 and 26, the present invention may further comprise a plurality of air nozzles 51, an air pump 52, and an air inlet 53. The plurality of air nozzles 51 enables the controlled airflow towards the target trailer surfaces. The air pump 52 generates the airflow that exits through the plurality of air nozzles 51. In addition, the air inlet 53 allows air to be moved into the air pump 52 to generate the airflow that exits through the plurality of air nozzles 51. The present invention can be arranged as follows. The air inlet 53 is integrated into the base structure 7 to allow air to enter the air pump 52. The air pump 52 is mounted within the base structure 7 so that the air pump 52 can be moved inside the base structure 7. Further, the plurality of air nozzles 51 is laterally integrated along the support column 2 to secure each air nozzle to the support column 2. Further, the plurality of air nozzles 51 is positioned opposite to the plurality of bristle sets 5 about the support column 2 so that the drying of the trailer's surfaces can be done separately. The air inlet 53 is in fluid communication with each of the plurality of air nozzles 51 through the air pump 52 to allow the movement of the air from the air inlet 53 to the plurality of air nozzles 51. Further, the controller 26 is electronically connected to the air pump 52 to enable the user to control the generation of airflow to dry the trailer's surfaces. In addition, the power source 27 is electrically connected to the air pump 52 to provide the power necessary for the operation of the air pump 52. This way, the user can choose to dry the trailer's surfaces to fully clean the trailer.

Figure 26:
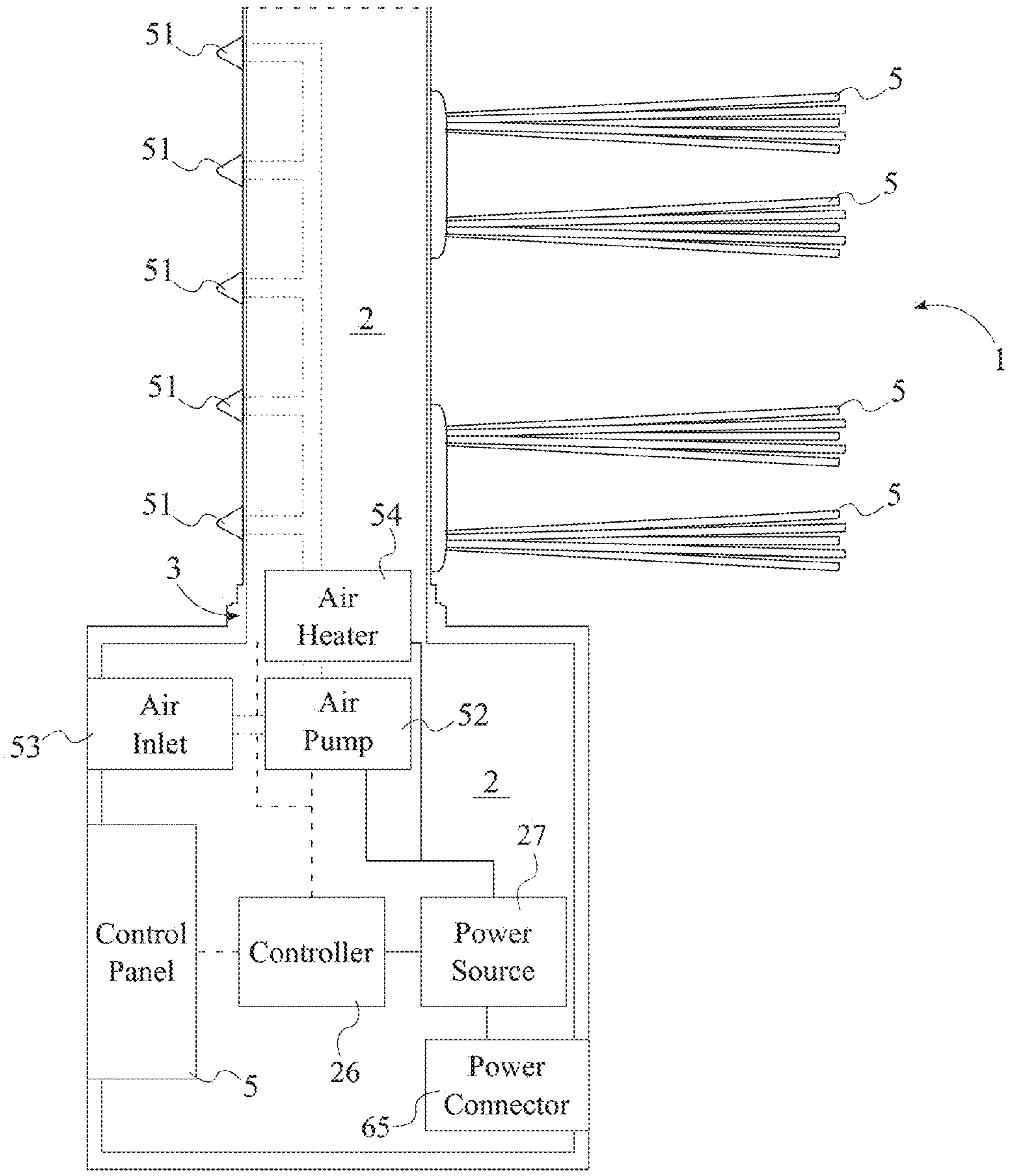
FIG. 26 is a schematic view showing a drying mechanism of the present invention, wherein the electronic connections are shown as dashed path lines, and wherein the electrical connections are shown as solid path lines.

As can be seen in FIG. 26, to further improve the drying of the trailer's surfaces, the present invention may further comprise an air heater 54. The air heater 54 warms the airflow generated by the air pump 52 to dry the trailer's surfaces at a faster rate. To do so, the air heater 54 is mounted within the base structure 7 so that the air heater 54 is moved along the base structure 7. In addition, the air inlet

53, the air pump 52, the air heater 54, and each of the plurality of air nozzles 51 are in serial fluid communication with each other. This way, the airflow generated by the air pump 52 is warmed up before reaching the plurality of air nozzles 51 so that the air drying the trailer's surfaces is warm. Further, the controller 26 is electronically connected to the air heater 54 to enable the user to control the operation of the air heater 54 along with the air pump 52. Likewise, the power source 27 is electrically connected to the air heater 54 to provide the power necessary for the operation of the air heater 54.

Figure 27:
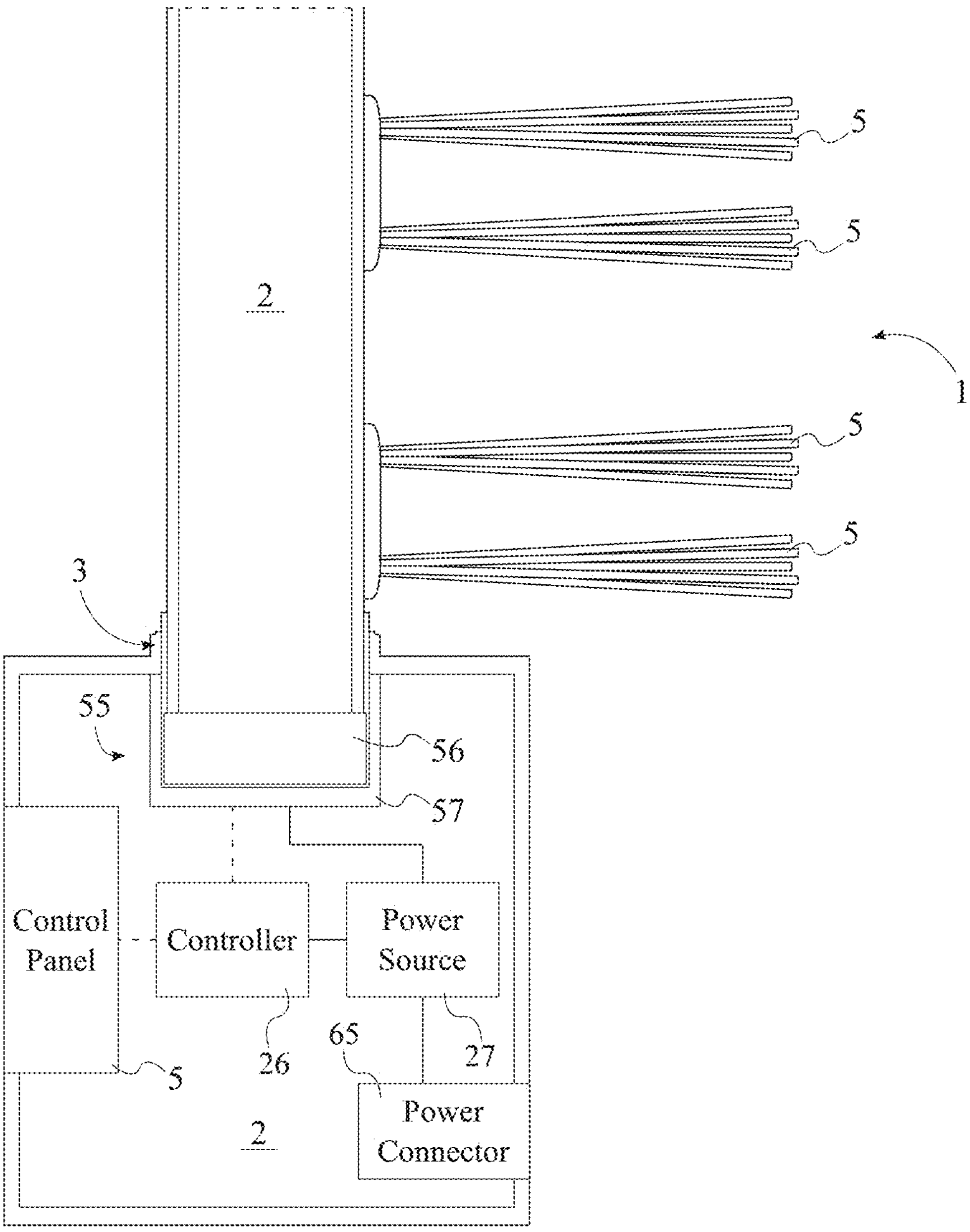
FIG. 27 is a schematic view showing an angular positioning of the support column of the present invention, wherein the electronic connections are shown as dashed path lines, and wherein the electrical connections are shown as solid path lines.

The support column 2 is designed to be rotated so that the desired nozzles are positioned towards the target trailer's surfaces while cleaning the trailer. As can be seen in FIG. 27, the present invention may further comprise a column-angular-positioning motor 55. The column-angular-positioning motor 55 enables the user to position the desired nozzles towards the target trailer's surfaces. The column-angular-positioning motor 55 comprises a rotor 56 and a stator 57 corresponding to the rotating and static portions of the column-angular-positioning motor 55, respectively. So, the stator 57 is mounted within the base structure 7 to secure the stator 57 within the base structure 7. Further, the first column end 3 is rotatably mounted to the base structure 7 to enable the rotation of the support column 2 on the base structure 7. In addition, the rotor 56 is torsionally connected to the first column end 3 to enable the controlled rotation of the support column 2 using the column-angular-positioning motor 55. Further, the controller 26 is electronically connected to the control panel 25 and the column-angular-positioning motor 55 to enable the user to control the operation of the column-angular-positioning motor 55. Furthermore, the power source 27 is electrically connected to the column-angular-positioning motor 55 to provide the power necessary for the operation of the column-angular-positioning motor 55.

In another embodiment, the present invention can be designed to dispense a cleaning solution to help clean the trailer's undercarriage. As can be seen in FIGS. 1 through 11 and 25, the present invention may further comprise at least one undercarriage nozzle 58 and at least one solution reservoir 59. The at least one undercarriage nozzle 58 enables the controlled dispensing of a cleaning solution onto the trailer's undercarriage. The at least one solution reservoir 59 retains an amount of cleaning solution that can be dispensed by the at least one undercarriage nozzle 58. In addition, the liquid pump 48 enables the movement of the cleaning solution from the at least one solution reservoir 59 to the at least one undercarriage nozzle 58 for dispensing. The present invention can be arranged as follows. The at least one solution reservoir 59 is mounted within the base structure 7 so that the at least one solution reservoir 59 can be moved inside the base structure 7. Further, the at least one undercarriage nozzle 58 is laterally connected to the base structure 7, offset to the support column 2, to secure the at least one undercarriage nozzle 58 to the base structure 7. Further, the at least one solution reservoir 59 is in fluid communication with the at least one undercarriage nozzle 58 through the liquid pump 48 to allow the movement of the cleaning solution from the at least one solution reservoir 59 to the at least one undercarriage nozzle 58. The user can control the operation of the at least one undercarriage nozzle 58 via the control panel 25 and the controller 26 so that cleaning solution is dispensed onto the trailer's undercarriage when desired.

As can be seen in FIGS. 17, 18, and 28, the at least one undercarriage nozzle 58 can be provided as a spray gun that is in fluid communication with the liquid pump 48 that allows the dispensing of cleaning solutions to any of the trailer's surfaces. The spray gun embodiment of the at least one undercarriage nozzle 58 allows the user to target any of the trailer's surfaces without being restricted to a specific orientation. Further, the spray gun embodiment allows the user to target higher surfaces that the traditional at least one undercarriage nozzle 58 would not be able to reach. In other embodiments, the at least one undercarriage nozzle 58 can be replaced with other accessories that allow for the dispensing of cleaning solutions to different surfaces around the trailer, the truck, or other attachments.

The present invention can provide various accessories that enable the user to fully clean the trailer, even hard to reach surfaces. As can be seen in FIGS. 15 through 17 and 22, in one embodiment, the present invention may further comprise a handheld brush 60 and a power cable 63. The handheld brush 60 enables the user to clean trailer surfaces that cannot be reached using the plurality of bristle sets 5. The power cable 63 enables the transmission of the power necessary for the operation of the handheld brush 60. Further, the handheld brush 60 can include an integrated mechanism that facilitates the cleaning of the target surfaces. So, the handheld brush 60 comprises a plurality of piezoelectric vibratable bristles 61 and a brush handle 62. The brush handle 62 corresponds to the structure that allows the user to handle the handheld brush 60. The plurality of piezoelectric vibratable bristles 61 includes several bristles that help clean the target surfaces. Further, the brush handle 62 is positioned external and offset to the base structure 7 so that the handheld brush 60 can be used separate from the at least one brush assembly 1. The plurality of piezoelectric vibratable bristles 61 is also mounted external to the brush handle 62 to secure each of the plurality of piezoelectric vibratable bristles 61 to the brush handle 62. Further, the power source 27 is electrically connected to the plurality of piezoelectric vibratable bristles 61 by the power cable 63 to provide the power necessary for the operation of the plurality of piezoelectric vibratable bristles 61. In some embodiments, the power cable 63 can be hardwired to the plurality of piezoelectric vibratable bristles 61 so that the handheld brush 60 is always connected to the power source 27. In other embodiments, the power cable 63 can be detached from the handheld brush 60 when the user wants to use the handheld brush 60. An integrated storage device that is rechargeable can be provided on the brush handle 62 to store enough power for the operation of the plurality of piezoelectric vibratable bristles 61 when not connected to the power source 27. In other embodiments, different accessories can be provided to help fully clean the trailer or other vehicles.

Although the invention has been explained in relation to its preferred embodiment, it is to be understood that many other possible modifications and variations can be made without departing from the spirit and scope of the invention.

What is claimed is:

1. A mobile trailer-cleaning system comprising:

at least one brush assembly;

a roof carriage;

an agitation mechanism;

a steering assembly;

the at least one brush assembly comprising a support column, a plurality of bristle sets, a base structure, a wheel assembly, and a base lifting mechanism;

the roof carriage comprising a carriage body, at least one roller, and at least one extension arm;

the support column comprising a first column end and a second column end;

the at least one roller being rotatably mounted to the carriage body;

the carriage body being terminally mounted to the at least one extension arm;

the second column end being terminally mounted to the at least one extension arm, opposite to the carriage body;

the first column end being mounted adjacent to the base structure;

the wheel assembly being mounted adjacent to the base structure by the base lifting mechanism, opposite to the first column end;

the steering assembly being mounted adjacent to the base structure, in between the first column end and the wheel assembly;

each of the plurality of bristle sets being distributed along the support column; and the plurality of bristle sets being laterally mounted onto the support column.

2. The mobile trailer-cleaning system as claimed in claim 1, wherein the plurality of bristle sets is a plurality of interchangeable bristle sets.

3. The mobile trailer-cleaning system as claimed in claim 1 comprising:

at least one accelerator control;

at least one drive system;

the at least one accelerator control being mounted onto the steering assembly;

the at least one drive system being mounted within the base structure;

the at least one drive system being operatively coupled to the wheel assembly, wherein the at least one drive system is used to selectively accelerate rotation of the wheel assembly; and the at least one accelerator control being operatively coupled to the at least one drive system, wherein the accelerator control is used to actuate the at least one drive system.

4. The mobile trailer-cleaning system as claimed in claim 3 comprising:

a remote control;

a controller;

a wireless communication module;

a power source;

the controller and the wireless communication module being mounted within the base structure;

the power source being integrated into the base structure;

the remote control being positioned external and offset to the base structure;

the remote control being communicably coupled to the controller through the wireless communication module;

the wireless communication module and the at least one drive system being electronically connected to the controller; and the wireless communication module and the controller being electrically connected to the power source.

5. The mobile trailer-cleaning system as claimed in claim 1 comprising:

the wheel assembly further comprising an assembly base, a pair of drive wheels, and at least one stability wheel;

the at least one stability wheel being positioned adjacent to the steering assembly;

the at least one stability wheel being positioned offset to the assembly base;

the at least one stability wheel being rotatably connected to the assembly base;

a rotation axis of the at least one stability wheel and a rotation axis of each of the pair of drive wheels being positioned perpendicular to the support column;

each of the pair of drive wheels being rotatably connected to the assembly base; and the assembly base being connected adjacent to the base structure by the base lifting mechanism, opposite to the support column.

6. The mobile trailer-cleaning system as claimed in claim 1 comprising:

at least one brake control;

at least one brake mechanism;

the at least one brake control being mounted onto the steering assembly;

the at least one brake mechanism being operatively integrated into the wheel assembly, wherein the at least one brake mechanism is used to selectively decelerate rotation of the wheel assembly; and the at least one brake control being operatively coupled to the at least one brake mechanism, wherein the at least one brake control is used to actuate the at least one brake mechanism.

7. The mobile trailer-cleaning system as claimed in claim 1 comprising:

the steering assembly comprising a first handlebar and a second handlebar; and the first handlebar and the second handlebar being positioned opposite to each other about the base structure.

8. The mobile trailer-cleaning system as claimed in claim 1 comprising:

an operator chariot; and the operator chariot being laterally connected to the wheel assembly, adjacent to the steering assembly.

9. The mobile trailer-cleaning system as claimed in claim 1 comprising:

a plurality of splash guards;

each of the plurality of splash guards being laterally connected to the support column; and each of the plurality of splash guards being positioned adjacent to at least one corresponding bristle set of the plurality of bristle sets.

10. The mobile trailer-cleaning system as claimed in claim 1 comprising:

a control panel;

a controller;

a power source;

an oscillating motor;

a reciprocating cam;

the support column comprising an elongated fixed portion and an elongated free portion;

the control panel being laterally mounted onto the base structure;

the controller, the oscillating motor, and the reciprocating cam being mounted within the base structure;

the power source being integrated into the base structure;

the elongated fixed portion and the elongated free portion being slidably mounted along each other;

the plurality of bristle sets being laterally mounted to the elongated free portion;

the elongated free portion being operatively coupled to the oscillating motor by the reciprocating cam, wherein the rotational motion produced by the oscillating motor is used to drive an oscillating linear motion of the reciprocating cam, and wherein the oscillating linear motion of the reciprocating cam is used to drive an oscillating linear motion of the elongated free portion;

the controller being electronically connected to the control panel and the oscillating motor; and the power source being electrically connected to the controller and the oscillating motor.

11. The mobile trailer-cleaning system as claimed in claim 1 comprising:

a control panel;

a controller;

a power source;

the agitation mechanism being a plurality of piezoelectric modules;

the control panel being laterally mounted onto the base structure;

the controller being mounted within the base structure;

the power source being integrated into the base structure;

each of the plurality of piezoelectric modules being integrated into the support column;

each of the plurality of piezoelectric modules being in vibrational communication with a corresponding bristle set of the plurality of bristle sets;

the controller being electronically connected to the control panel and the plurality of piezoelectric modules; and the power source being electrically connected to the controller and the plurality of piezoelectric modules.

12. The mobile trailer-cleaning system as claimed in claim 1 comprising:

the at least one brush assembly being a first brush assembly and a second brush assembly;

the at least one extension arm being a first extension arm and a second extension arm;

the first extension arm being laterally connected to the carriage body;

the second extension arm being laterally connected to the carriage body, opposite to the first extension arm;

the second column end of the first brush assembly being terminally mounted to the first extension arm, opposite the carriage body; and the second column end of the second brush assembly being terminally mounted to the second extension arm, opposite the carriage body.

13. The mobile trailer-cleaning system as claimed in claim 12 comprising:

the first extension arm and the second extension arm each comprising a distal arm section, a proximal arm section, and an arm joint;

the proximal arm section being laterally connected to the carriage body;

the distal arm section being pivotably connected to the proximal arm section by the arm joint;

the second column end of the first brush assembly being terminally mounted to the distal arm section of the first extension arm, opposite to the proximal arm section of the first extension arm; and the second column end of the second brush assembly being terminally mounted to the distal arm section of the second extension arm, opposite to the proximal arm section of the second extension arm.

14. The mobile trailer-cleaning system as claimed in claim 1 comprising:

a plurality of soap nozzles;

at least one soap reservoir;

a liquid pump;

a controller;

a power source;

the controller, the at least one soap reservoir, and the liquid pump being mounted within the base structure;

the power source being integrated into the base structure;

the plurality of soap nozzles being laterally integrated along the support column;

the plurality of soap nozzles being positioned offset to the plurality of bristle sets about the support column;

the at least one soap reservoir being in fluid communication with each of the plurality of soap nozzles through the liquid pump;

the controller being electronically connected to the liquid pump; and the power source being electrically connected to the liquid pump.

15. The mobile trailer-cleaning system as claimed in claim 1 comprising:

a plurality of water nozzles;

at least one water reservoir;

a liquid pump;

a controller;

a power source;

the controller, the at least one water reservoir, and the liquid pump being mounted within the base structure;

the power source being integrated into the base structure;

the plurality of water nozzles being laterally integrated along the support column;

the plurality of water nozzles being positioned offset to the plurality of bristle sets about the support column;

the at least one water reservoir being in fluid communication with each of the plurality of water nozzles through the liquid pump;

the controller being electronically connected to the liquid pump; and the power source being electrically connected to the liquid pump.

16. The mobile trailer-cleaning system as claimed in claim 1 comprising:

a plurality of air nozzles;

an air pump;

a controller;

a power source;

an air inlet;

the controller and the air pump being mounted within the base structure;

the power source and the air inlet being integrated into the base structure;

the plurality of air nozzles being laterally integrated along the support column;

the plurality of air nozzles being positioned opposite to the plurality of bristle sets about the support column;

the air inlet being in fluid communication with each of the plurality of air nozzles through the air pump;

the controller being electronically connected to the air pump; and the power source being electrically connected to the air pump.

17. The mobile trailer-cleaning system as claimed in claim 16 comprising:

an air heater;

the air heater being mounted within the base structure;

the air inlet, the air pump, the air heater, and each of the plurality of air nozzles being in serial fluid communication with each other;

the controller being electronically connected to the air heater; and the power source being electrically connected to the air heater.

18. The mobile trailer-cleaning system as claimed in claim 1 comprising:

a control panel;
a controller;
a power source;
a column-angular-positioning motor;
the column-angular-positioning motor comprising a rotor and a stator;
the control panel being laterally mounted onto the base structure;
the controller and the stator being mounted within the base structure;
the power source being integrated into the base structure;
the first column end being rotatably mounted to the base structure;
the rotor being torsionally connected to the first column end;
the controller being electronically connected to the control panel and the column-angular-positioning motor; and
the power source being electrically connected to the controller and the column-angular-positioning motor.

19. The mobile trailer-cleaning system as claimed in claim 1 comprising:
at least one undercarriage nozzle;
at least one solution reservoir;
a liquid pump;
a controller;
a power source;
the controller, the at least one solution reservoir, and the liquid pump being mounted within the base structure;
the power source being integrated into the base structure;
the at least one undercarriage nozzle being laterally connected to the base structure, offset to the support column;
the at least one solution reservoir being in fluid communication with the at least one undercarriage nozzle through the liquid pump;
the controller being electronically connected to the liquid pump; and
the power source being electrically connected to the liquid pump.

20. The mobile trailer-cleaning system as claimed in claim 1 comprising:
a handheld brush;
a power cable;
a power source;
the handheld brush comprising a plurality of piezoelectric vibratable bristles and a brush handle;
the power source being integrated into the base structure;
the brush handle being positioned external and offset to the base structure;
the plurality of piezoelectric vibratable bristles being mounted external to the brush handle; and
the power source being electrically connected to the plurality of piezoelectric vibratable bristles by the power cable.

* * * * *